United States Patent [19]
Fuyama et al.

[11] Patent Number: 5,377,097
[45] Date of Patent: Dec. 27, 1994

[54] CUSTOMER ORDER PROCESSING SYSTEM

[75] Inventors: Seiji Fuyama; Kenichi Ishikawa, both of Yokohama; Satoko Momose, Tama; Tokio Mori, Yokohama, all of Japan

[73] Assignee: Matsushita Electric Industrial Co., Ltd., Osaka, Japan

[21] Appl. No.: 979,192

[22] Filed: Nov. 20, 1992

[30] Foreign Application Priority Data

Nov. 26, 1991 [JP] Japan .................. 3-310490

[51] Int. Cl.$^5$ ............................................. G06F 15/24
[52] U.S. Cl. .................................. 364/401; 235/383; 364/405; 364/478
[58] Field of Search ............... 364/400, 401, 405, 406, 364/407, 709.03, 478, 479, 468; 235/383

[56] References Cited

U.S. PATENT DOCUMENTS

| | | | |
|---|---|---|---|
| 4,388,689 | 6/1983 | Hayman et al. | 364/401 |
| 4,530,067 | 7/1985 | Dorr | 364/401 |
| 4,547,851 | 10/1985 | Kurland | 364/401 |
| 4,843,547 | 6/1989 | Fuyama et al. | 364/405 |
| 5,003,472 | 3/1991 | Perrill et al. | 364/401 |
| 5,128,862 | 7/1992 | Mueller | 364/405 |
| 5,235,509 | 8/1993 | Mueller et al. | 364/405 |

Primary Examiner—Roy N. Envall, Jr.
Assistant Examiner—J. L. Hazard
Attorney, Agent, or Firm—Stevens, Davis, Miller & Mosher

[57] ABSTRACT

A customer order processing system includes a register terminal for sequentially transmitting customer order registered in the register terminal to a kitchen video controller, wherein the customer orders as received are sequentially displayed on a display device of the kitchen video controller. Upon completion of preparation for a customer order by a person in charge, the display of that customer order on the display device of the kitchen video controller is erased by manipulating a control switch. A time length between the reception of the customer order and the erasure thereof is measured and stored as service time data in the kitchen video controller 12. The register terminal totalizes the service time data transmitted from the kitchen video controller 12 to issue a management report. With this customer order processing system, not only the service times taken for the disposition of customer orders can be managed but also speedy transmission of the customer orders to the kitchen as well as a reduction in the time taken for the preparation of the customer orders can be achieved.

20 Claims, 36 Drawing Sheets

FIG. 12

121 AVERAGE SERVICE TIME

SERVICE TIME REPORT

| TIME | CNT | SV TIME | AVG |
|---|---|---|---|
| 10:30 — 12:00 | 12 | 1620 | 2.15 |
| 12:00 — 13:00 | 25 | 4025 | 2.41 |
| 13:00 — 14:00 | 11 | 1276 | 1.56 |
| ⋮ | ⋮ | ⋮ | ⋮ |
| 19:00 — 20:00 | 45 | 8775 | 3.15 |
| 20:00 — 22:00 | 6 | 420 | 1.10 |
| ALL | 126 | 21672 | 2.52 |

| SV TIME | CNT | % |
|---|---|---|
| UNDER 2.00 | 28 | 22.2 |
| UNDER 3.30 | 104 | 82.5 |
| UNDER 5.00 | 125 | 99.2 |
| ALL | 126 | |

122 DESIRED SERVICE TIME ATTAINMENT RATE

FIG. 22

BLINKING

| :#101: | #102 | | |
|---|---|---|---|
| 1 HAMB | 2 HAMB | | |
| 2 JUICE | | | |
| | | | |
| COMPLETE | | | |

MESSAGE INDICATING COMPLETION OF
REGISTRATION OF ORDER #101

FIG. 23A

3 [HAMB]
   [JUICE] ⟶ TRANSMISSION OF "3 HAMB"
2 [COFFEE] ⟶ TRANSMISSION OF "JUICE"
   [TOTAL] ⟶ TRANSMISSION OF "2 COFFEE"

[CASE OF NO CORRECTION]

FIG. 23B

3 [HAMB]
   [CORRECTION]
3 [DBL-HAMB]
   [JUICE] ⟶ TRANSMISSION OF "3 DBL-HAMB"
2 [COFFEE] ⟶ TRANSMISSION OF "JUICE"
   [TOTAL] ⟶ TRANSMISSION OF "2 COFFEE"

[CASE OF CORRECTION]

[ORDER ID NUMBER]
[ORDER DESTINATION]

| #101 EATIN | #102 TAKEOUT | | |
|---|---|---|---|
| 1 HAMB | 2 HAMB | | |
| 2 JUICE | 3 COFFEE | | |

FIG. 36

| 36-1 PLU CODE | 36-2 ITEM NAME | 36-3 UNIT PRICE | 36-4 STEER INFORMATION FLAG (STEER 1~4) | | | |
|---|---|---|---|---|---|---|
| PLU #10 | COFFEE | 150 | 1 | 1 | 0 | 0 |
| PLU #20 | JUICE | 200 | 1 | 1 | 0 | 0 |
| PLU #30 | HAMB | 250 | 1 | 0 | 1 | 0 |
| ⋮ | ⋮ | ⋮ | | | | |

FIG. 37

37a STEER INFORMATION FLAG

| | 37b DISPLAY DEVICE ID NUMBER | | |
|---|---|---|---|
| | 1 | 2 | 3 |
| STEER #1 | 1 | 0 | 0 |
| 2 | 0 | 1 | 0 |
| 3 | 0 | 0 | 1 |
| 4 | 0 | 0 | 0 |

FIG.40A

EXAMPLE OF STRUCTURE OF ORDER

| ITEM NAME | NUMBER | STEER | | | |
|---|---|---|---|---|---|
| | | 1 | 2 | 3 | 4 |
| COFFEE | 1 | 1 | 1 | 0 | 0 |
| JUICE | 2 | 1 | 1 | 0 | 0 |
| HAMB | 3 | 1 | 0 | 1 | 0 |

FIG.40B

```
1 COFFEE
2 JUICE
3 HAMB
```

TRANSMISSION ITEM (40B) OF "STEER 1"
(TO DISPLAY DEVICE #1)

FIG.40C

```
1 COFFEE
2 JUICE
```

TRANSMISSON ITEM (40C) OF "STEER 2"
(TO DISPLAY DEVICE #2)

FIG.40D

```
3 HAMB
```

TRANSMISSION ITEM (40D) OF "STEER 3"
(TO DISPLAY DEVICE #3)

FIG. 46A

461 DISPLAY DEVICE #1

| #101 1 COFFEE 1 HAMB | #102 2 HAMB | #103 1 JUICE 1 HAMB | #104 2 JUICE 1 HAMB 2 COFFEE |
|---|---|---|---|

462 DISPLAY DEVICE #2

| #101 1 COFFEE | #103 1 JUICE | #104 2 JUICE 2 COFFEE | #105 3 HAMB (NOT OCCUPIED BEFORE) |
|---|---|---|---|

EXAMPLE OF BACKUP DISPLAY OF DISPLAY DEVICE #3

463 DISPLAY DEVICE #3

| #101 1 HAMB | #102 2 HAMB | #103 1 HAMB | #104 1 HAMB |
|---|---|---|---|

FIG. 46B

| #105 3 HAMB |
|---|

| 551 PLU CODE | 552 ITEM NAME | 553 UNIT PRICE | 554 DISPLAY COLOR DATA OF KITCHEN VIDEO CONTROLLER |
|---|---|---|---|
| PLU#10 | COFFEE | 150 | 1 |
| PLU#20 | JUICE | 200 | 2 |
| PLU#30 | HAMB | 250 | 3 |
| ⋮ | ⋮ | ⋮ | ⋮ |

CUSTOMER ORDER PROCESSING SYSTEM

BACKGROUND OF THE INVENTION

The present invention relates to a customer order processing system for use in the field of the dining service industry and the like, and more particularly to a customer order processing system for managing transmission of customer orders to a kitchen and the time (referred to as service time) during which an order item or order items designated by a customer are prepared.

In the present state of the art in the field of the dining service industry, there has been proposed no customer order processing system, for use in the shops of the dining service industry, which is designed to manage customer service time based on a combination of the transmission of a customer order to a kitchen and the time taken in preparing the transmitted customer order.

As the business scale of the dining service industry increases, there arises a demand for speedy transmission of customer orders to a kitchen and a reduction of time taken for the preparation of an order item or order items to thereby improve customer service. As requirements to be satisfied by such a customer order processing system, the following items may be considered.

(1) To measure a time period (i.e., service time) from the time of display of a customer order inputted from a register terminal on a kitchen display to the erasure of the customer order therefrom by a person in charge thereof, upon completion of the preparation of the order.

(2) To calculate an average value of service times and to issue a management data report of the average service time.

(3) To preliminarily set a selective time zone, to calculate the average service time in the set time zone, and to issue a management data report of the average service time in the set time zone.

(4) To preliminarily set a desired value for the service times, to obtain a rate of the service times which have been defined in the above paragraph (1) and which fall within the desired value, and to issue a report on the rate of the service times thus obtained as management data of a desired service time attainment rate.

(5) To preliminarily set selective time zones, to calculate the desired service time attainment rate, which has been defined in the above paragraph (4), in each time zone, and to issue a management data report of the desired service time attainment rates in the set time zones, respectively.

(6) To calculate the average service time as defined in the above paragraph (2) for every person who is engaged in the preparation for the order displayed on the kitchen display, and to issue a management data report of the average service time for each person.

(7) To calculate the desired service time attainment rate as defined in the paragraph (4) for every person who is engaged in the preparation for the order displayed on the kitchen display, and to issue a management report on the desired service time attainment rate for each person.

(8) To calculate the average service times as defined in the paragraph (2) for every destination to which an ordered item or ordered items are to be delivered, and to issue a management data report of the average service time for each destination.

(9) To calculate the desired service time attainment rate as defined in the above paragraph (4) for every order destination, and to issue a management report on the desired service time attainment rate for each order destination.

SUMMARY OF THE INVENTION

It is therefore a primary object of the present invention to realize a novel management system useful in the field of the dining service industry.

More specifically, it is an object of the present invention to provide a customer order processing system which is highly useful in managing the service time for a customer order by the combined use of the transmission of a customer order to a kitchen and the time taken in preparing the transmitted customer order.

In order to attain the above and other objects, which will become more apparent in accordance with the following descriptions, there is provided a customer order processing system according to a general aspect of the present invention which comprises a register terminal and a kitchen video controller, wherein the register terminal includes a transmitting unit sequentially transmitting customer orders as they are registered therein to the kitchen video controller, and the kitchen video controller includes a display device for sequentially displaying the customer orders as they are received from the register terminal, a control switch input device for allowing a person in charge of preparing a customer order to erase a display of the customer order on the display device upon completion of the preparation of the customer order, a service time data storage unit for measuring a time period from a time point of the reception of the customer order to a time point of the erasure of the customer order and storing the measured time period as service time data, and a management report issuing unit for transmitting the service time data stored in the service time data storage unit to the register terminal in response to a request command issued by the register terminal, thereby issuing a management report.

Thus, in accordance with the customer order processing system of the present invention, the customer orders registered in the register terminal are sequentially transmitted to the video controller via a transmission line to be displayed in succession on the display device of the kitchen video controller. Persons, who are in charge of preparing the customer orders, prepare ordered items, while viewing the customer orders displayed sequentially on the display device. Upon completion of the preparations for the customer orders, the associated customer order on the kitchen display is erased by the respective persons in charge. In this way, the kitchen video controller can measure a time period from the time of reception of an customer order to the time of erasing the customer order from the display device, as a service time, and use the measured time period as service time management data.

BRIEF DESCRIPTION OF THE DRAWINGS

FIG. 12 is a diagram showing an example of a service time report prepared in the system according to the first embodiment;

FIG. 22 is a diagram showing an example of a display made by the kitchen video comprised in the system according to the third embodiment;

FIGS. 23A and 23B are diagrams for illustrating an example of a key operation in the register terminal and an example of timing control for transmission to the kitchen video controller in the system according to a fourth embodiment of the present invention;

FIG. 36 is a diagram showing a structure of a setting file for setting order items in the system according to the eighth embodiment;

FIG. 37 is a diagram showing a structure of a display device ID number setting table used in the system according to the eighth embodiment;

FIGS. 40A, 40B, 40C and 40D are diagrams showing an example of a structure of an order and that of a classification of transmission item groups in the system according to the eighth embodiment;

FIGS. 46A and 46B are diagrams showing examples of displays made by the kitchen video controller according to the ninth embodiment of the present invention;

DESCRIPTION OF THE PREFERRED EMBODIMENTS

The customer order processing system according to the embodiments of the present invention will be described in conjunction with the accompanying drawings.

Figure 1:
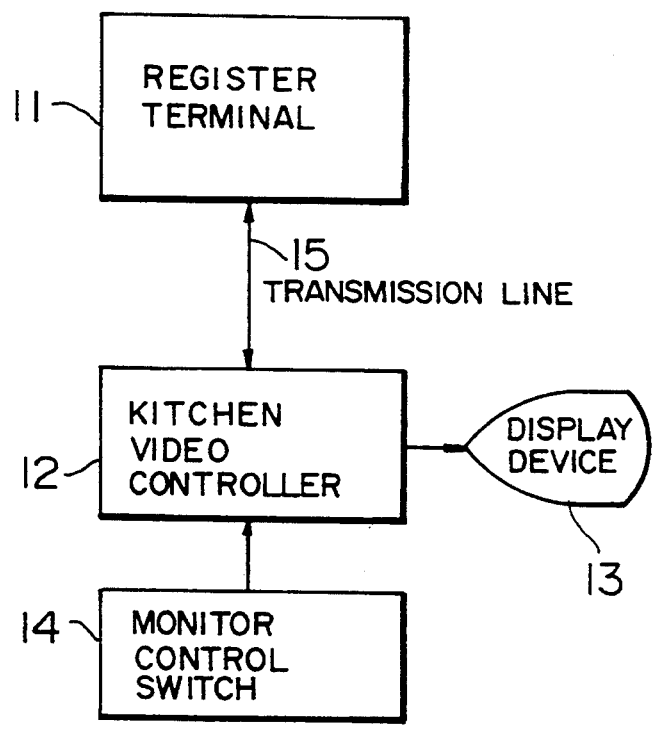
FIG. 1 is a block diagram showing a general arrangement of a customer order processing system according to a first embodiment of the present invention.

FIG. 1 shows a general arrangement of a customer order processing apparatus according to a first embodiment of the present invention. Referring to the figure, a register terminal 11 is connected to a kitchen video controller 12 via a transmission line 15. Connected to the kitchen video control 12 is a monitor control switch 14 for controlling the content of a display device 13.

Figure 2:
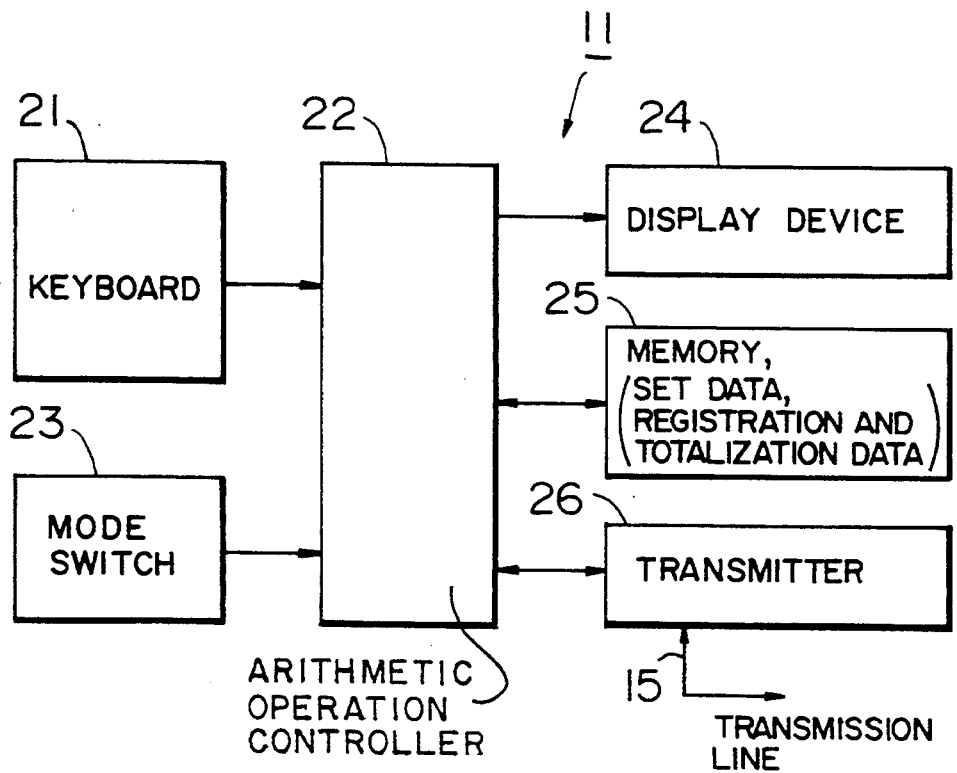
FIG. 2 is a block diagram showing a structure of a register terminal comprised in the system shown in FIG. 1.

FIG. 2 shows a structure of the register terminal 11. In this figure, a reference numeral 21 denotes a keyboard which includes numeral registering keys, ordered item or article registering keys, a totalizing key and others, as required. Upon operation of these keys, corresponding key codes are generated and supplied to an arithmetic operation controller 22 which incorporates a read-only memory (hereinafter referred to as ROM) which stores processing programs used for performing the tasks assigned to the register terminal 11. In addition to the keyboard 21, there are connected to the operation controller 22 a mode switch 23, a display device 24, a memory 25 and a transmitter 26.

Figure 3:
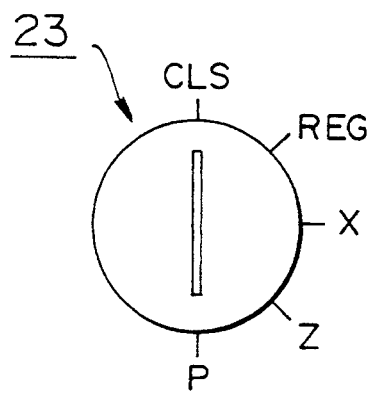
FIG. 3 is an external view of a mode switch comprised in the register terminal in the first embodiment shown in FIG. 2.

FIG. 3 shows schematically an external appearance of the mode switch 23. Referring to the figure, this mode switch 23 serves to designate operation modes, such as a close (CLS) mode, registration (REG) mode, inspection (X) mode, adjustment (Z) mode, setting (P) mode, etc. The switch input data inputted by manipulating the mode switch 23 is read by the arithmetic operation controller 22 before the execution of the task processing program to thereby determine the processing to be performed. The display device 24 displays the contents of the processings, such as the contents of registered orders and the contents of reports which are made at the time of inspection and adjustment, respectively.

The memory 25, shown in FIG. 2, stores set data required for registration processings and totalization processings as well as data generated accompanying these processings. Also, it contains a service time data file having a structure shown in FIG. 6 and a desired service time attainment rate data file having a structure shown in FIG. 7. The transmitter 26 sequentially transmits orders, as they are registered, to the kitchen video controller 12 and further performs transmission processings such as the transmission of a totalized data request command to the kitchen video controller 12 at the time of making a relevant report and the totalization processing of the data supplied from the kitchen video controller 12.

Figure 4:
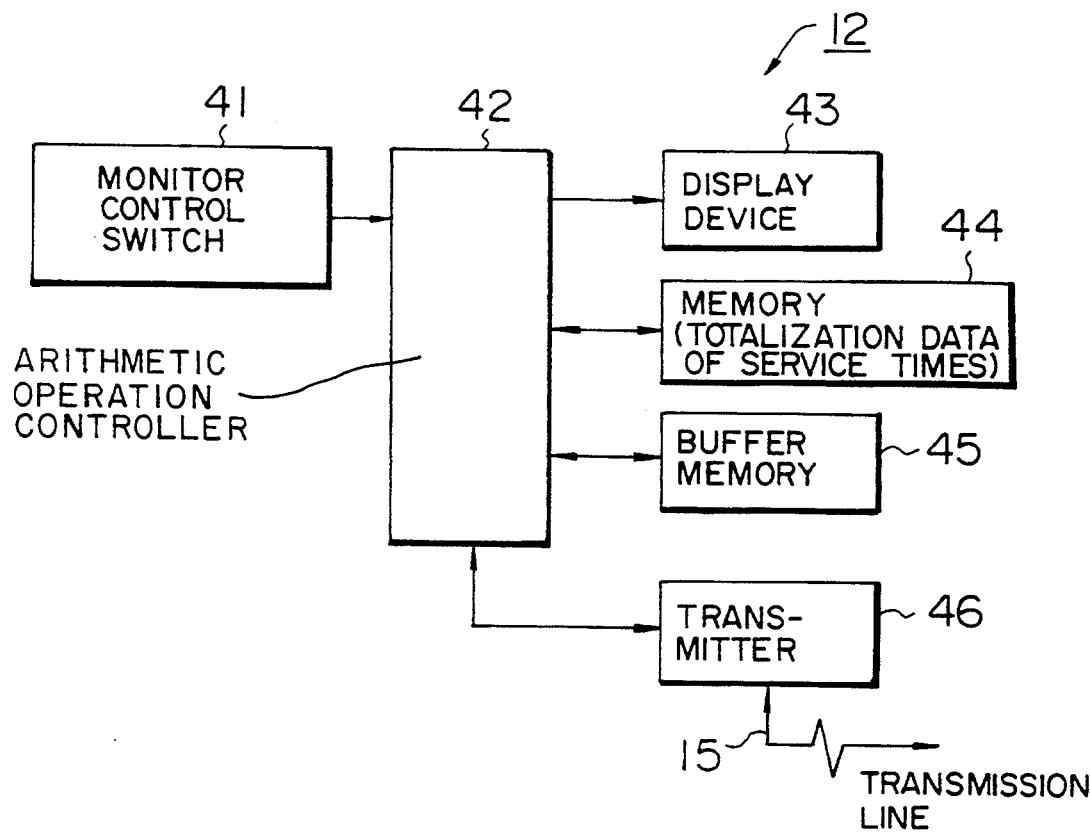
FIG. 4 is a diagram showing a structure of a kitchen video controller comprised in the system shown in FIG. 1.

FIG. 4 shows a structure of the kitchen video controller 12. In this figure, a reference numeral 41 denotes a monitor control switch.

Figure 5:
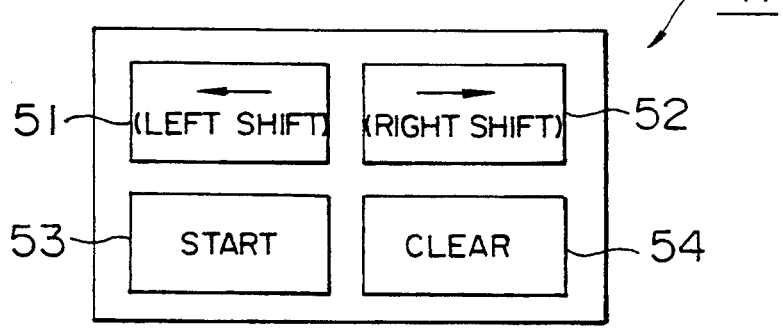
FIG. 5 is an external view of a monitor control switch comprised in the system shown in FIG. 1.

FIG. 5 shows a structure of the monitor control switch 41. Referring to this figure, an array of keys, such as a right-hand shift key, a left-hand shift key, a start key, a clear key and others, as required are provided. Upon actuation of these keys, corresponding key signals are generated and supplied to an arithmetic operation controller 42 which incorporates a read-only memory (ROM) and has a clock function for measuring current time and elapsed time. The ROM stores processing programs for the tasks performed by the kitchen video controller. Connected to the operation controller 42 are a display device 4, a memory 44, a buffer memory 45 and a transmitter 46, in addition to the monitor control switch 41 mentioned above. The display device 43 is adapted to display orders transmitted from the register terminal 11 on a time-series basis as the orders are received.

Stored in the memory 44 are set data, which are required for totalization of the service times, and service time data which are inputted every time an order displayed on the display device is erased.

Figure 8:
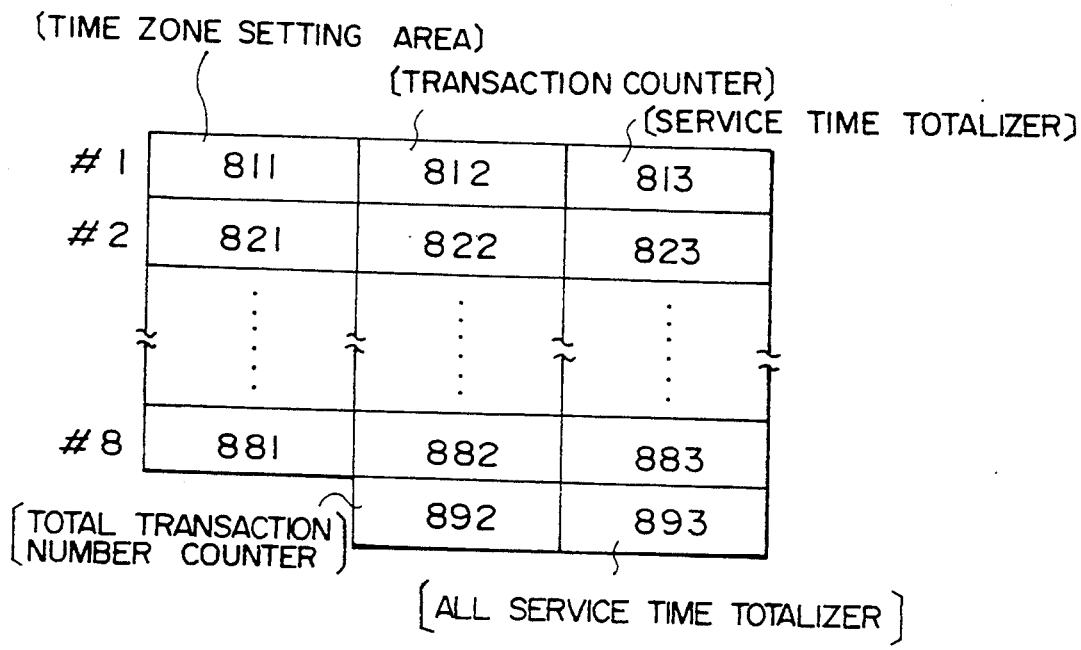
FIG. 8 is a diagram for illustrating a structure of a service time data file contained in the kitchen video controller comprised in the system shown in FIG. 1.
Figure 9:
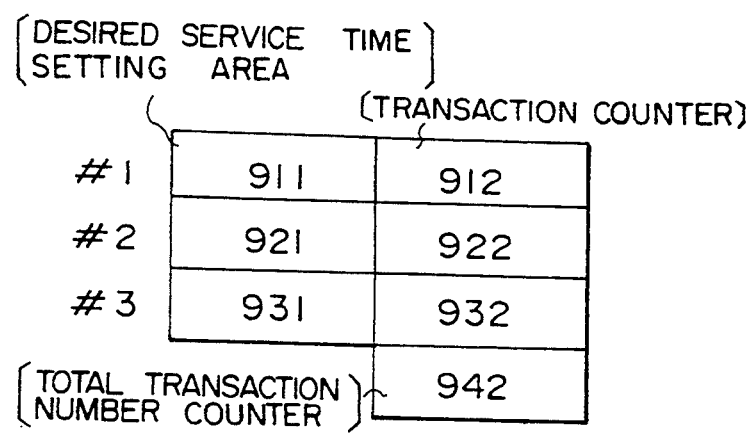
FIG. 9 is a diagram for illustrating a structure of a desired service time attainment rate data file contained in the kitchen video controller comprised in the system shown in FIG. 1.

FIG. 8 shows a service time data file stored in the memory 44, and FIG. 9 shows a desired service time attainment rate data file also stored in the memory 44.

When the orders transmitted from the register terminal 11 exceeds display capacity of the display device 43, overflowing data are temporarily stored in the buffer memory 45. The transmitter/receiver unit 46 receives customer orders from the register terminal 11 via the transmission line 15. The transmitter/receiver unit 46 also responds to reception of a totalized data request command from the register terminal 11 at the time of issuance of a report and transmits the obtained totalized data to the register terminal 11.

Next, a description will be made of the operation of the customer order processing system according to the first embodiment of the invention.

Figure 13:
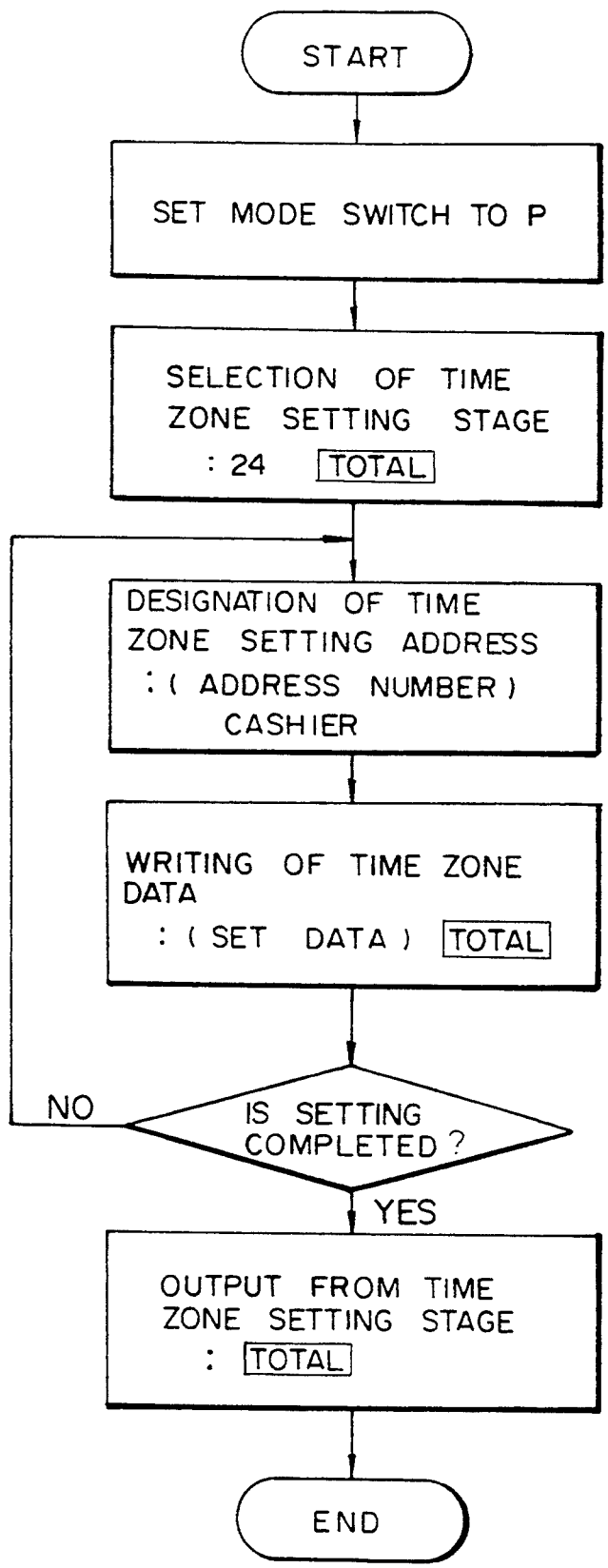
FIG. 13 is a flow chart showing time zone setting processings executed in the register terminal comprised in the system according to the first embodiment.

FIG. 13 is a flow chart illustrating a process for setting time zone data in the memory 25 of the register terminal 11.

Figure 6:
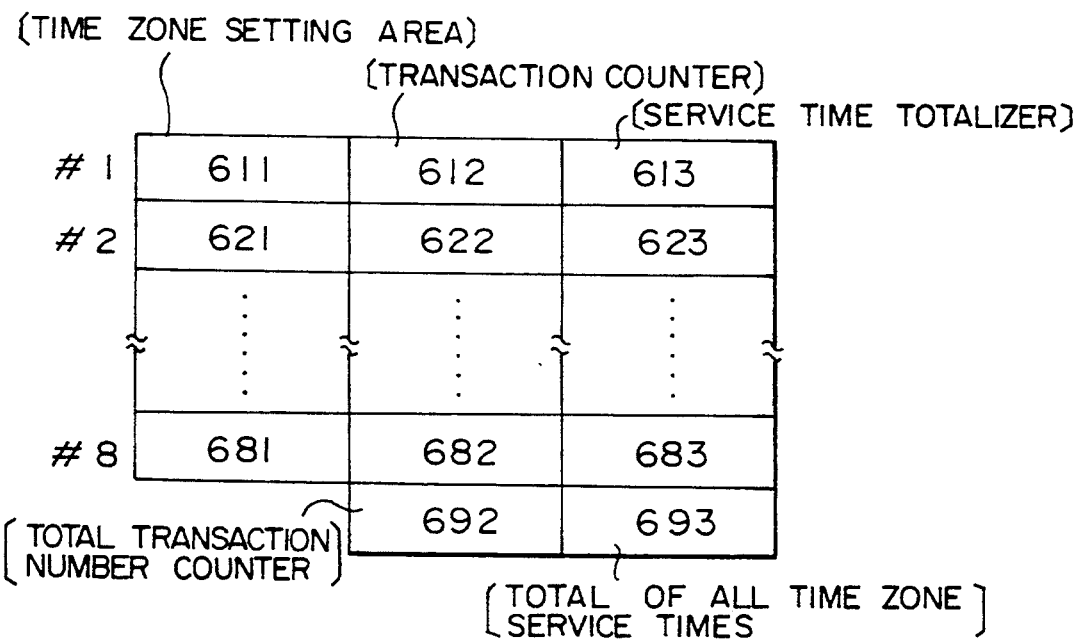
FIG. 6 is a diagram for illustrating a structure of a service time data file contained in the register terminal comprised in the system shown in FIG. 1.

Referring to FIG. 6, the service time data file stored in the memory 25 includes eight time zone (or time period) setting areas 611, 621, . . . , 681, transaction number counters (sales times counters) 612, 622, . . . , 682 provided corresponding to the time zone setting areas, respectively, service times counters 613, 623, . . . , 683 provided corresponding to the time zone setting areas, respectively, a total transaction number counter (total sales times counter) 692 and a total service time counter 693.

Figure 17:
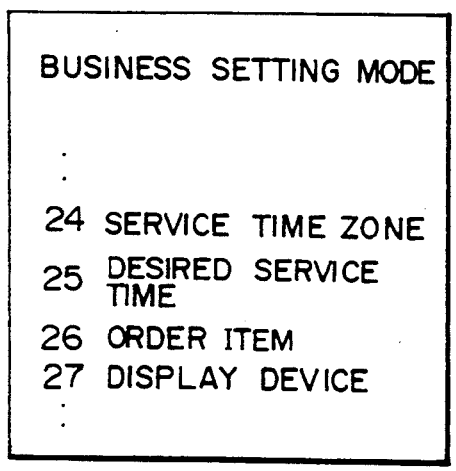
FIG. 17 is a diagram showing an example of a display of the register terminal when its operation is designated to the setting mode (P) in the system according to the first embodiment.

When the operation of the register terminal 11 is designated to the setting mode (P) by the mode switch 23, a business menu in the setting mode (P), shown in FIG. 17, is displayed. At this time, by inputting "24" and "TOTAL" through the corresponding keys of the keyboard 21, the time zone setting stage 24 is selected. Subsequently, by actuating the keys labeled "1" and "CASHIER", respectively, of the keyboard, an address #1(611) is designated from among the eight time zone setting areas of the service time data file. Through subsequent manipulation of keys labeled "SET DATA" and "TOTAL", respectively, optional time zone data are set at the address #1(611) of the associated time zone setting area. By way of example, assuming that "17151830" is written as the setting data, a time zone from 17:15 to 18:30 is set. By repeating key manipulations mentioned above while changing the address number "#" in a manner shown in FIG. 13, optional time zones can be set at the addresses #1 to #8 (611, 621, 631, . . . , 681) of the associated time zone setting area. Upon completion of the time zone data setting operation in the register terminal 11, the setting stage is terminated by actuating the key labeled "TOTAL". At this time, the time zone set data mentioned above are automatically transmitted from the transmitter 26 of the register terminal 11 to the kitchen video controller 12 and are loaded in eight time zone setting areas 811, 821, 831, . . . , 881, respectively, in the service time data file stored in the memory 44 of the kitchen video controller 12 shown in FIG. 8.

Figure 7:
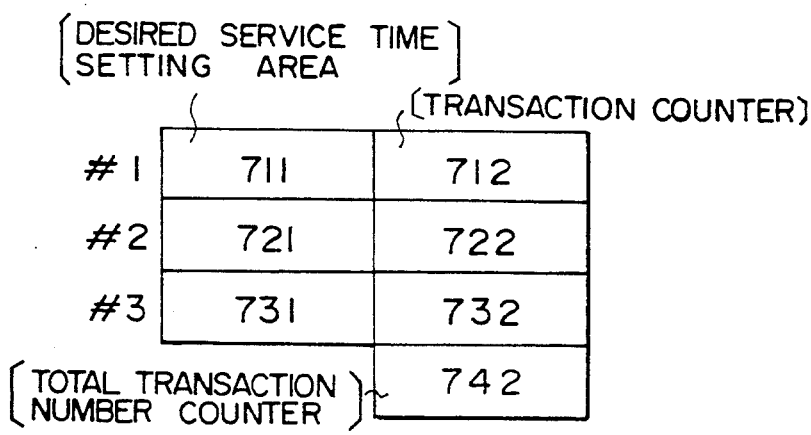
FIG. 7 is a diagram for illustrating a structure of a desired service time attainment rate data file contained in the register terminal comprised in the system shown in FIG. 1.
Figure 14:
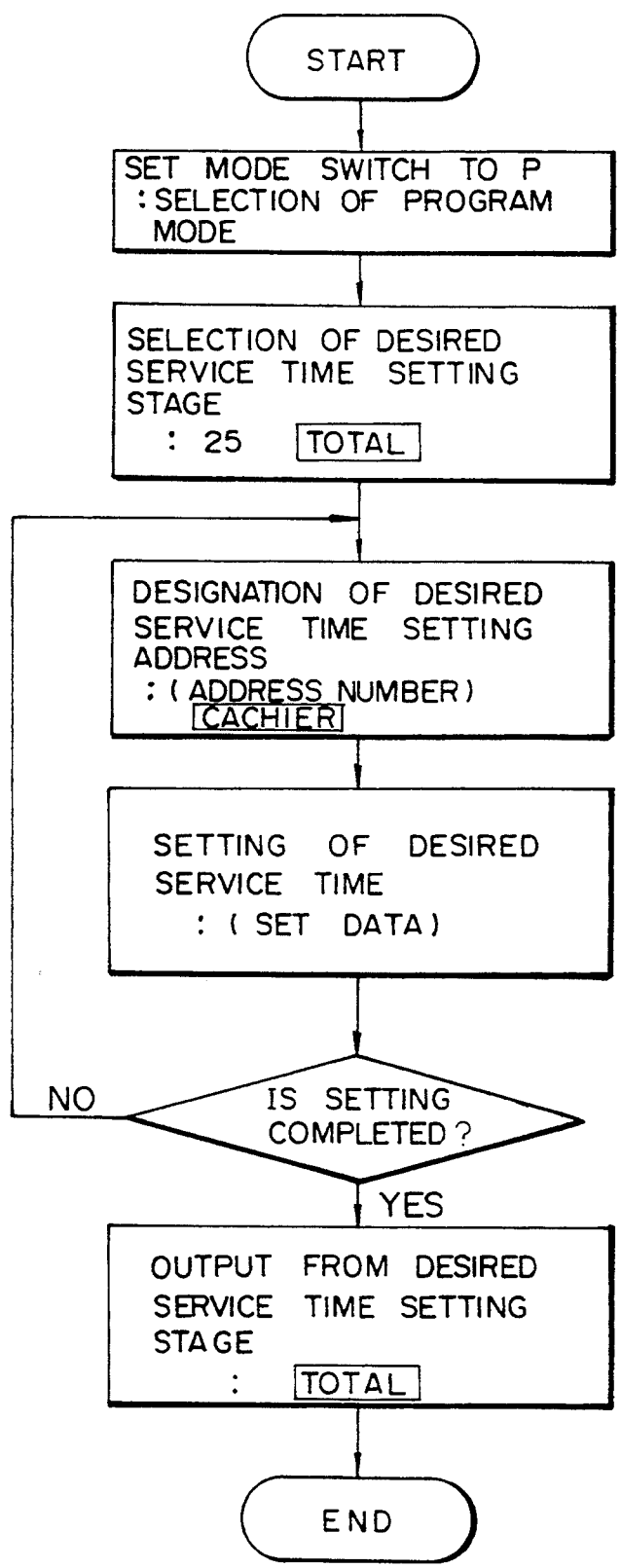
FIG. 14 is a flow chart showing desired service time setting processings executed in the register terminal comprised in the system according to the first embodiment.

FIG. 14 shows a processing of setting desired service time in the memory 25 of the register terminal 11. The desired service time attainment rate data file stored in the memory 25 includes three desired service time setting areas 711, 721 and 731, transaction number counters 712, 722 and 732 corresponding to the three desired service time setting areas and a transaction number counter 742, as shown in FIG. 7.

Next, when the operation of the register terminal 11 is designated to the setting mode (P) by the mode switch 23, a business menu is displayed in the setting mode as shown in FIG. 17. At this time, by inputting "25" and "TOTAL" through the corresponding keys of the keyboard 21, the desired service time setting stage 25 is selected. Subsequently, by actuating the keys labeled "1" and "CASHIER", respectively, of the keyboard, an address #1(711) is designated from among three setting areas of the desired service time attainment rate data file. Through subsequent manipulation of the keys labeled "SET DATA" and "TOTAL", respectively, optional time zone data are set at the address #1(711) of the associated setting area. By way of example, assuming that "210" is written as the setting data, a desired service time of 210 seconds (3 minutes and 30 seconds) is set. By repeating the key manipulations mentioned above while changing the address number "#" in a manner shown in FIG. 14, optional desired service times can be set at addresses #1 to #3 (711, 721 and 731) of the associated setting area. Upon completion of the desired service time data setting operation, the current setting stage can be terminated by actuating the key labeled "TOTAL" in the register terminal. At that time, the desired service time setting data mentioned above are automatically transmitted from the transmitter 26 of the register terminal 11 to the kitchen video controller 12 and are loaded in three desired service time setting areas 911, 921 and 931, respectively, of the desired service time attainment ratio data file stored in the memory 44 of the kitchen video controller 12 shown in FIG. 9.

Figure 16:
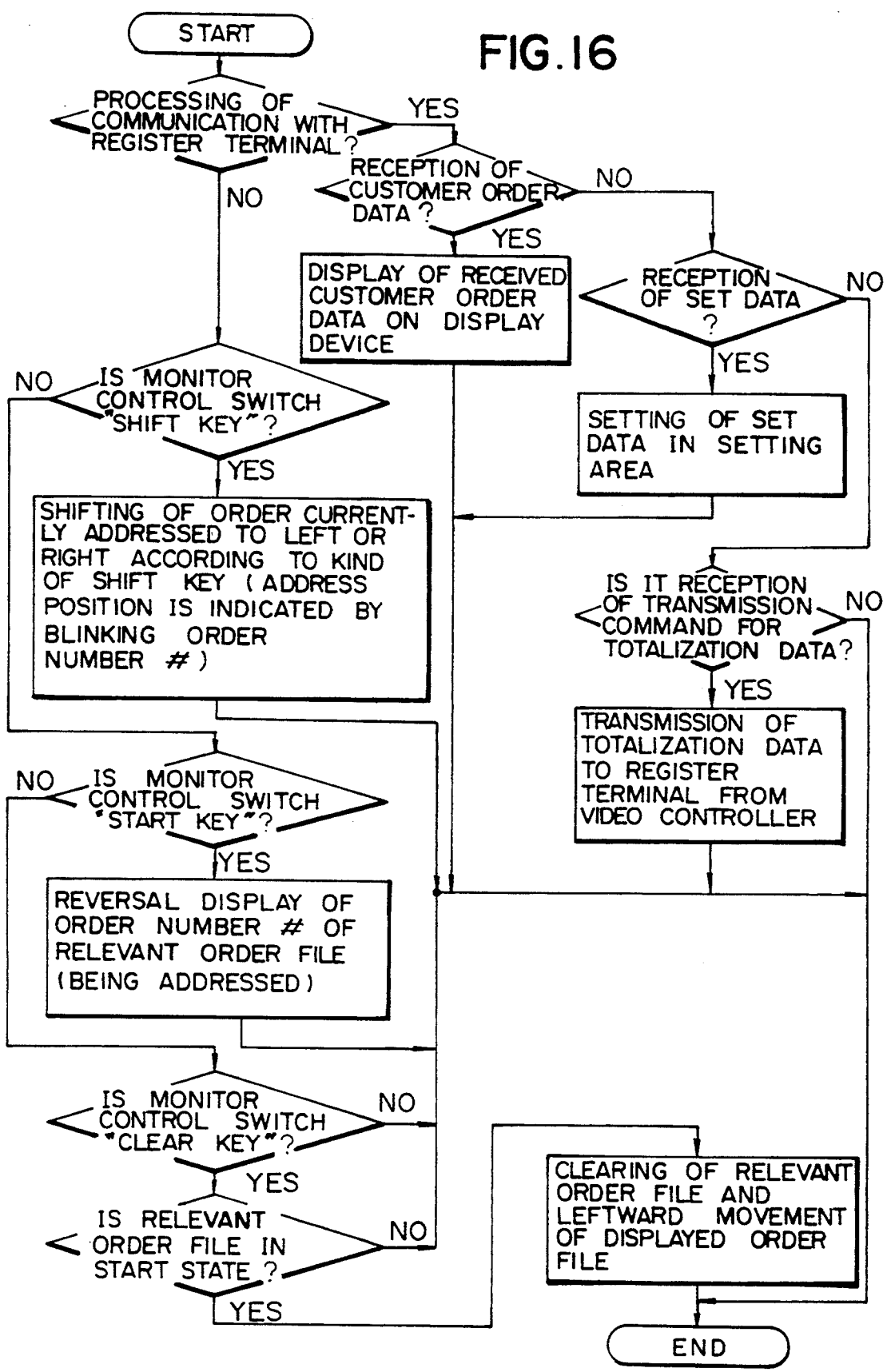
FIG. 16 is a flow chart for illustrating an operation of the kitchen video controller comprised in the system according to the first embodiment.

Next, the flow chart in FIG. 16 shows a series of processings including order registration in the register terminal 11 and the associated display of the order registered in the register terminal on the display device of the kitchen video controller 12, the erasure of an order from the display device upon completion of preparation for the order by a person who is in charge of preparation for the order, the totalization of the service time for the order by measuring the elapsed time from the reception of the order to the erasure thereof in the kitchen video controller, etc., and the operations involved in the execution of the processings are explained.

Figure 10:
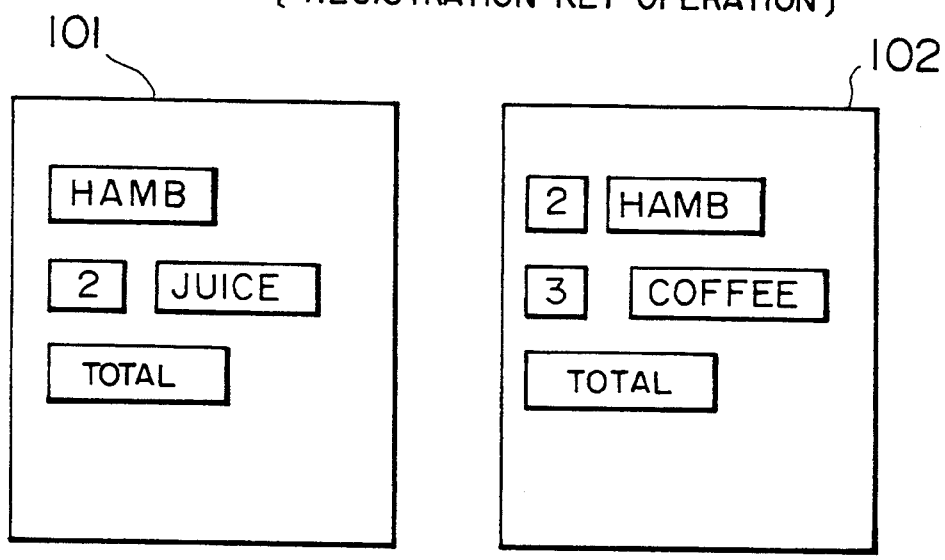
FIGS. 10A and 10B are diagrams showing examples of key operations and customer orders, respectively, appearing in the register terminal comprised in the system shown in FIG. 1.

FIGS. 10A and 10B show examples of key manipulation for the order registration in the register terminal 11 and example of the orders as registered.

As a result of the key manipulation 101 shown in FIG. 10A, one hamburger (HAMB) and two cups or bottles of juice (JUICE) are registered, and the contents of a corresponding order sheet shown at 103 in FIG. 10B is displayed on the display device 24. In FIG. 10B "#101" represents an order ID number assigned automatically to the order in serial numbers, as the order is registered. Further, "1 HAMB 250" indicates that one hamburger (HAMB) and a price of 250 yens therefor have been registered, and "2 JUICE 400" indicates that two JUICEs and a price of 400 yens therefor have been registered. Further, "TAX" represents an amount of consumption tax, and "TOTAL" indicates a total sum of the prices of the registered items and the consumption tax. In the examples shown in FIG. 10B, it will be seen that the order ID number "#101" is first registered and the registration of the order ID number "#102" follows.

Figure 11:
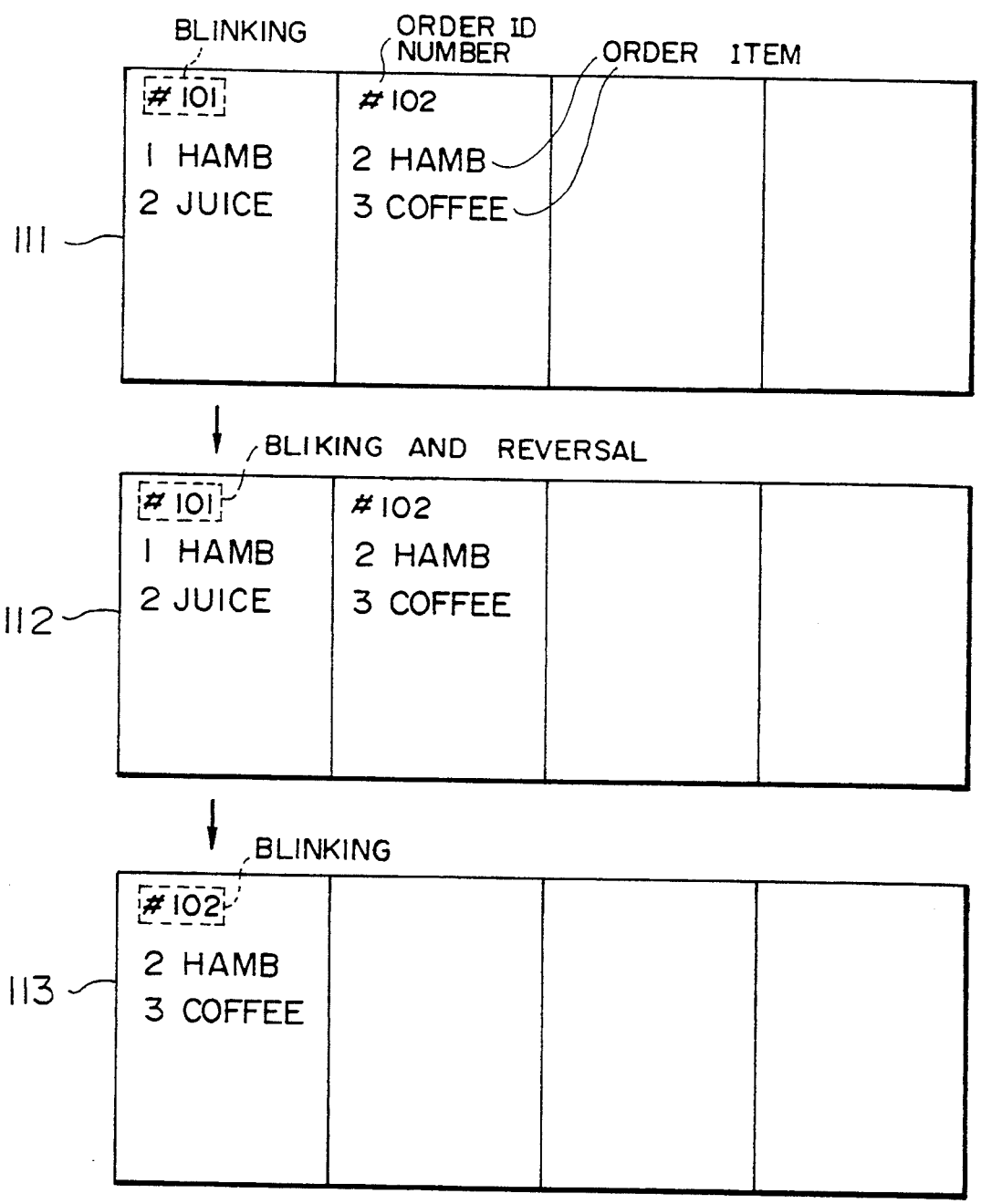
FIG. 11 is a diagram showing examples of displays generated by the kitchen video controller comprised in the system according to the first embodiment.

Upon registration of the orders shown in FIG. 10B in the register terminal 11, these orders are successively transmitted to the kitchen video controller 12 via the transmission line 15 to be displayed on the display device 13 in a manner shown in the display example 111 in FIG. 11, upon every operation of the key "SUM" which indicates completion of the order registration.

Figure 19:
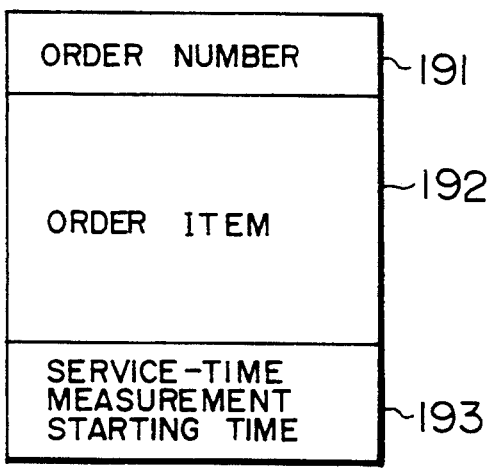
FIG. 19 is a diagram showing a structure of an order file transmitted from the register terminal to the kitchen video controller in the system according to the first embodiment.

FIG. 19 shows a structure of an order file transmitted from the register terminal 11 to the kitchen video controller 12, as described above. In FIG. 19, reference numeral 191 denotes an area for storing the order ID number, 192 denotes an area for storing the ordered item(s) or article(s), and 193 denotes an area for storing a service-time measurement starting time. Upon reception of this order file from the register terminal 11, the kitchen video controller 12 stores the time of reception thereof in the service-time measurement starting time area 193.

In FIG. 11, the cursor position is indicated by blinking the order ID number. The cursor position can be moved to the left or right by the operation of a left shift key 51 or a right shift key 52 contained in the monitor control switch 41 shown in FIG. 5.

A person who is in charge of preparation for the order actuates the start key 53 in the monitor control switch 41 shown in FIG. 5, upon starting the preparation for the order. As a result of this key operation, the display of the kitchen video controller 12 changes to a state such as illustrated in the display example 112 in FIG. 11 in which the display of the order ID number "#101" is reversed. This is done for the purpose of indicating that the present order is under preparation and thereby preventing the present order from being prepared in duplication, which might otherwise occur when a plurality of persons are engaged in the preparation of the orders. Upon completion of the preparation for the order numbered "#101", the person in charge actuates a clear key 54 contained in the monitor control switch 41 shown in FIG. 5 to thereby erase the order "#101", as result of which the display of the kitchen video controller 12 is changed to a state shown in the display example 113 in FIG. 11.

At this time, the service-time measurement starting time 193 shown in FIG. 19 and stored in the order file for the order "#101" is subtracted from the time at which the order "#101" is erased, to thereby measure the service time spent in making preparation for the order "#101".

Next, a description will be made of the storage of a service time thus measured as mentioned above in the service time data file shown in FIG. 8. By comparing the aforementioned service time measurement starting time 193 shown in FIG. 19, which represents the time at which the kitchen video controller 12 has received the order "#101", with the eight time zone setting areas 811, 821, 831, ..., 881 shown in FIG. 8, respectively, a time zone corresponding to the time, at which the preparation of the order "#101" has been completed, is selected. Then the service time for the order "#101" is added to a service time totalizer corresponding to the selected time zone and is also added to the all service time totalizer 893. Besides, a corresponding transaction (sales times) counter and the total transaction number (sales times) counter 892 are incremented by "1", respectively.

Now, a description will be made of the storage of a service time in the desired service time attainment rate data file shown in FIG. 9. The service time taken for the preparation for the order "#101" as shown in FIG. 10B is compared with the three desired service times 911, 921 and 931, respectively, which have been preliminarily stored in the desired service time attainment rate data file shown in FIG. 9. When a present service time is shorter than any one of the desired service times mentioned above, respective corresponding transaction counters are incremented by "1". At the same time, the total transaction number (sales times) counter 942 is also incremented by "1".

Figure 15:
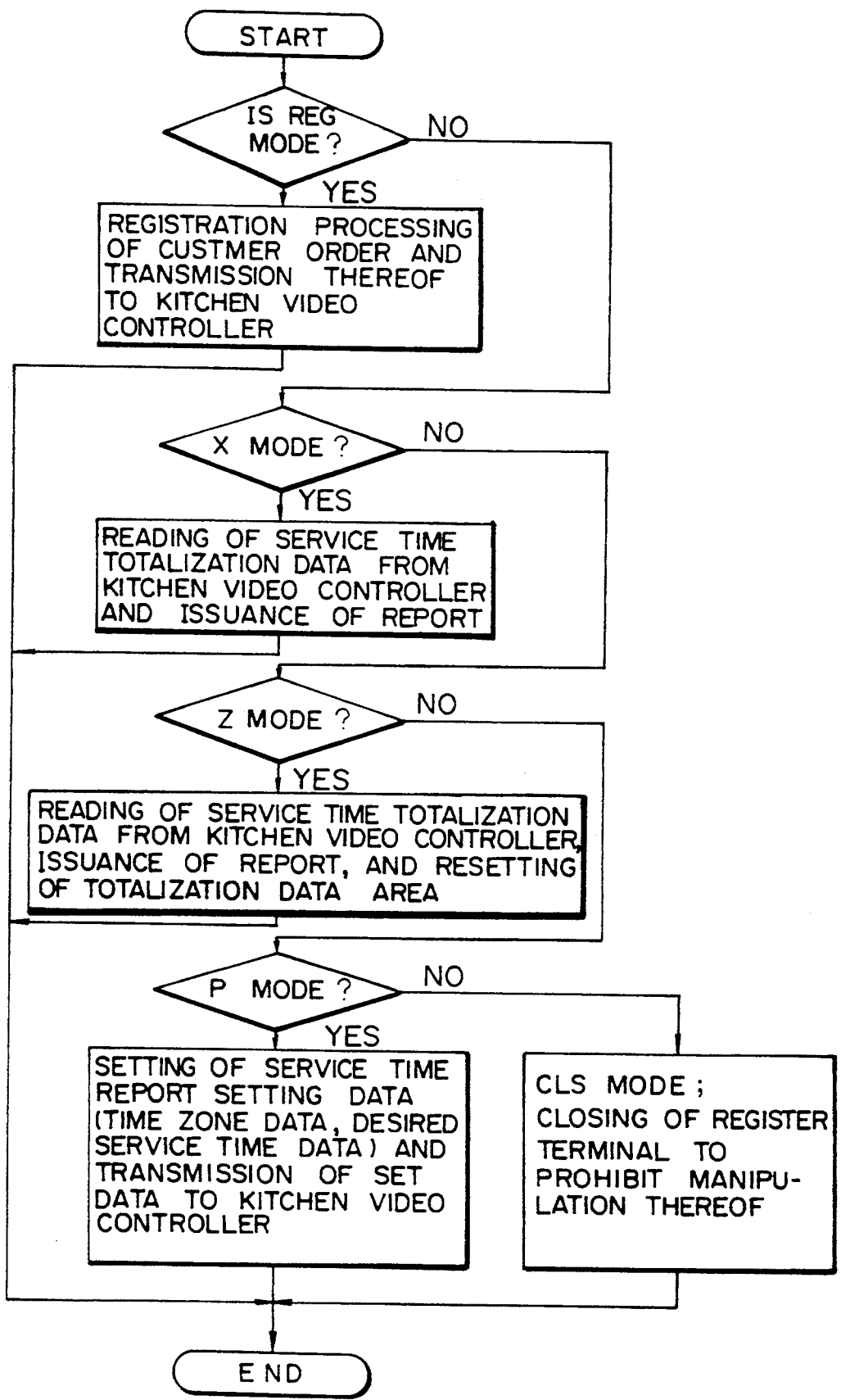
FIG. 15 is a flow chart for illustrating an operation of the register terminal comprised in the system according to the first embodiment.
Figure 18:
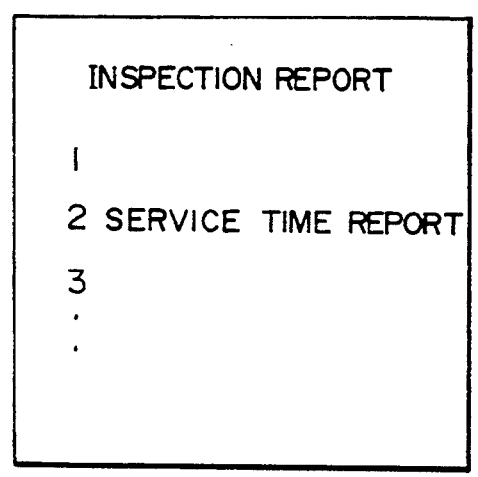
FIG. 18 is a diagram showing an example of a display of the register terminal when its operation is designated to the inspection mode (X) in the system according to the first embodiment.

FIG. 15 is a flow chart showing processing steps of the operation modes of the register terminal 11. Referring to the figure, each of the operation modes of the customer order processing system, such as close (CLS), registration (REG), inspection (X), adjustment (Z), setting (P) or the like, is designated by operating the mode switch 23 shown in FIG. 2, whereby the processings of each of the operation modes as designated is performed in the manner shown in FIG. 15. More specifically, when the operation of the register terminal 11 is designated to the inspection mode (X) by the mode switch 23, a report menu in the inspection mode, such as shown in FIG. 18, is displayed. Upon actuation of the keys "2" and "TOTAL" of the keyboard 21, the transmitter 26 transmits a service time totalization data request command to the kitchen video controller 12. As the kitchen video controller 12 receives the service time totalization data request command, it responds to the reception of the command and sends to the register terminal 11 the content of the service time data file shown in FIG. 8 and that of the desired service time attainment rate data file shown in FIG. 9, both files being kept in the kitchen video controller 12.

The register terminal 11 once stores the above-mentioned totalization data in the service time data file shown in FIG. 6 and the desired service time attainment rate data file shown in FIG. 7, both files being kept in the register terminal 11, and then the register terminal 11 displays the service time data on a time-zone basis and the desired service time attainment rate data on the display device 13 in such a manner as shown in FIG. 12.

In the report display shown in FIG. 12, in the display example 121, "10:30–12:00" in the column of "TIME", "12" in the column of "CNT", "1620" in the column of "SV TIME" and "2.15" in the column of "AVG" indicate that the number of orders processed in the time zone from ten thirty to twelve is 12, the total of service times taken for preparation of these orders is 1620 seconds and the average service time per each order is 2 minutes and 15 seconds (i.e., 135 seconds), respectively. Further, in the display example 122, "SVTIME: UNDER 2.00, CNT: 28, %: 22.2" indicate that the number of orders disposed of within two minutes is 28 throughout all the time zones, and a ratio of this number of orders (28) to the total number of orders is 22.2%.

Further, when the register terminal operation is set to the adjustment mode (Z) by the mode switch 23 an then the key manipulation is performed in a manner similar to that in the inspection mode (X), the register terminal 11 displays the service time data on a time-zone basis and the data of the desired service time attainment rate on the display device 23 in a manner similar to the case of the inspection mode (X) shown in FIG. 12. However, the display in the adjustment mode (Z) differs from that of the inspection mode (X) in that the kitchen video controller 12 responds to the totalization data request command mentioned previously and sends relevant data to the register terminal 11 from the data files shown in FIGS. 8 and 9, and then clears the corresponding data area.

Now, a second embodiment of the present invention will be described.

The second embodiment differs from the first embodiment in that the service time measuring processing is modified as compared with the first embodiment. More specifically, in the case of the first embodiment, the service-time measurement starting time point is defined by the time at which the kitchen video controller 12 receives an order file from the register terminal 11, whereupon the order file reception time point is stored in the service-time measurement starting time area 193 shown in FIG. 19. By contrast, in the second embodiment of the present invention, the time point at which the register terminal 11 starts to book a first item of a customer order is stored in the service-time measurement starting time area 193 in the transmission order file shown in FIG. 19. Thus, the service time can be defined as the time elapsed from a time point when the register terminal 11 starts to book an order to a time point when the order display on the kitchen display device 43 is erased by a person who is in charge of preparation for the order, upon completion of the associated preparation.

Next, a description will be made of a third embodiment of the present invention. The third embodiment differs from the first embodiment in that the process of transmitting a customer order from the register terminal 11 to the kitchen video controller 12 is modified as compared with the first embodiment. More specifically, in the case of the first embodiment, upon registration of orders shown in FIGS. 10A and 10B in the register terminal 11, these orders are sequentially transmitted to the kitchen video controller 12 via the transmission line 15 every time the key "TOTAL" is operated to complete the order (i.e., the transmission of order(s) on an order-by-order basis). By contrast, in the third embodiment of the present invention, every time an item of an order is registered in the register terminal 11, the registered item is transmitted from the register terminal 11 to the kitchen video controller 12 via the transmission line 15 to thereby perform the order transmission at a higher speed (i.e., the transmission of order(s) on an item-by-item basis).

Figure 20:
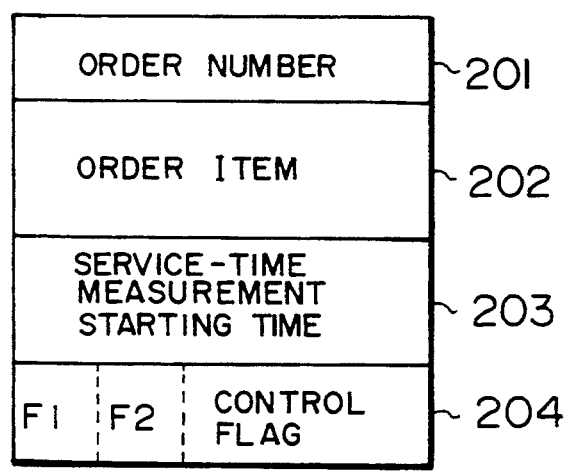
FIG. 20 is a diagram showing a structure of an order file transmitted from the register terminal to the kitchen video controller in the system according to a third embodiment of the present invention.

FIG. 20 shows a structure of an order file for use in the order transmission in the third embodiment of the present invention. In the figure, reference numeral 201 denotes an order ID number storing area, 202 denotes an order item storing area, 203 denotes a service time measurement starting time storing area, and 204 denotes a control flag storing area in which F1 indicates a first transmission and F2 indicates a last transmission.

Figure 21:
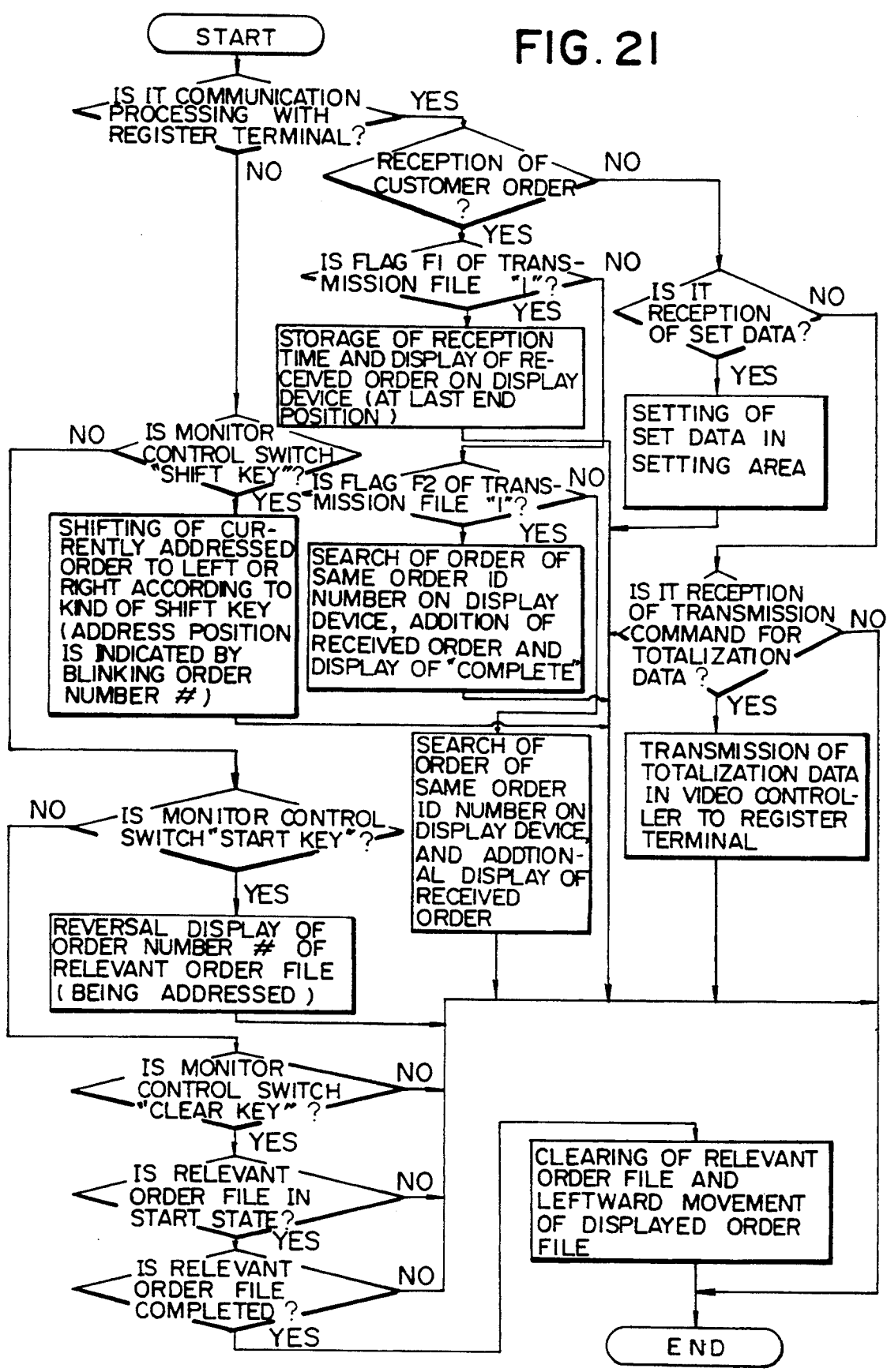
FIG. 21 is a flow chart for illustrating an operation of the kitchen video controller comprised in the system according to the third embodiment of the present invention.

FIG. 21 is a flow chart showing an operation of the kitchen video controller 12 in the system according to the third embodiment of the present invention. Referring to this figure, when the control flag F1 has been set in the control flag storing area 204 shown in FIG. 20 thereby indicating the first transmission of an order from the register terminal 11, the kitchen video controller 12 stores the reception time of that order in the service-time measurement starting time area 203 and at the same time displays the received order at the last end position of the order group displayed on the display device 43. On the other hand, in the case where none of the control flags F1 and F2 has been set, which indicates the present transmission is an intermediate order item transmission, the kitchen video controller 12 searches an order of the same order number in the order group displayed on the display device 43, and displays the received order item in the area 202 in addition to the items of the same order being displayed. Upon reception of a further order item when the control flag F2 is set in the control flag storing area 204, thereby indicating the transmission of the last item of the present order, the kitchen video controller 12 searches an order of the same order ID number in the order group displayed on the display device 43, and displays the received order item in the area 202 in addition to the items of the same order displayed, and, at the same time, displays "COMPLETE" indicating completion of the order registration, as shown in FIG. 22. The clear key 54 of the monitor control switch 41 shown in FIG. 5 is used to erase only an order in which "COMPLETE" has been displayed (i.e., the order in which the control flag F2 has been set), as shown by step 8 and 19 in the flow chart shown in FIG. 21.

Now, a description will be made of a fourth embodiment of the present invention.

The fourth embodiment differs from the first embodiment and the third embodiment in respect of the method of the order transmission from the register terminal 11 to the kitchen video controller 12. More specifically, in the case of the first embodiment, upon registration of an order shown in FIGS. 10A and 10B in the register terminal 11, the order is transmitted sequentially to the kitchen video controller 12 via the transmission line on an order-by-order basis, every time the key "TOTAL" is actuated upon completion of reception of the order. While, in the case of the third embodiment, every time an order item is registered, the item thus registered is transmitted from the register terminal 11 to the kitchen video controller 12 via the transmission line 15 (i.e., on an item-by-item basis). In the fourth embodiment of the present invention at every registration of an order item in the register terminal 11, an order item immediately before the current order item is transmitted from the register terminal 11 to the kitchen video controller 12 via the transmission line 15 on an item-by-item basis.

FIG. 23A is a diagram showing a timing relation of the registration of an order item and the transmission of a preceding order item to the kitchen video controller 12. Referring to the figure, three hamburgers (HAMB) are first registered in the register terminal 11 by manipulating the keys "3" and "HAMB", respectively. However, since this is a first item registration in the same customer order, no data transmission is carried out to the kitchen video controller 12. Subsequently, one cup (or bottle) of juice is registered by manipulating the key "JUICE". At this time point, the item data "3 HAMB" registered immediately before is transmitted to the kitchen video controller 12 in the state where the control flag in the control flag storing area 204 in the transmission order file shown in FIG. 20 is set to F1=1, indicating that this is an initial transmission. Subsequently, by the key manipulation of "2 COFFEE", two cups of coffee are registered as a third order item. At this time point, the item "JUICE" registered immediately before is transmitted to the kitchen video controller 12. Finally, the key "TOTAL" is actuated, whereupon this order is completed, and a total amount of the present customer order is displayed on the display device 24, and, at the same time, the item "2 COFFEE" registered immediately before is transmitted to the kitchen video controller 12 in the state where the control flag in the control flag storing area 204 in the transmission order file shown in FIG. 20 is set to F2=1, indicating that this is a final transmission.

FIG. 23B shows, by way of example, operations performed in the registration and transmission of ordered items in order to explain an advantage of the transmission method according to the fourth embodiment of the present invention. Referring to the figure, after the actuation of the keys "3" and "HAMB", respectively, the registration of "3 HAMB" is corrected by the key "CORRECTION" and then "3 DBL-HAMB (double-hamburger" is registered by the actuation of the keys "3" and "DBL-HAMB". Such a kind of correction often occurs in the customer order registration. In the transmission method of the fourth embodiment described above, the information "3 HAMB" has not yet been transmitted to the kitchen video controller 12 at the time point when the correcting operation is performed. Therefore, no display thereof is made on the display device 43 of the kitchen video controller 12. As compared therewith, in the above-described third embodiment, an order item is transmitted to the kitchen video controller 12 whenever it is registered in the register terminal 11. Accordingly, after the order item "3 HAMB" is displayed on the display device 43 of the kitchen video controller 12, the correction of the same display content to "3 DBL-HAMB" follows, which may possibly give rise to confusion on the part of a person who is in charge of preparation for this order.

Figure 24:
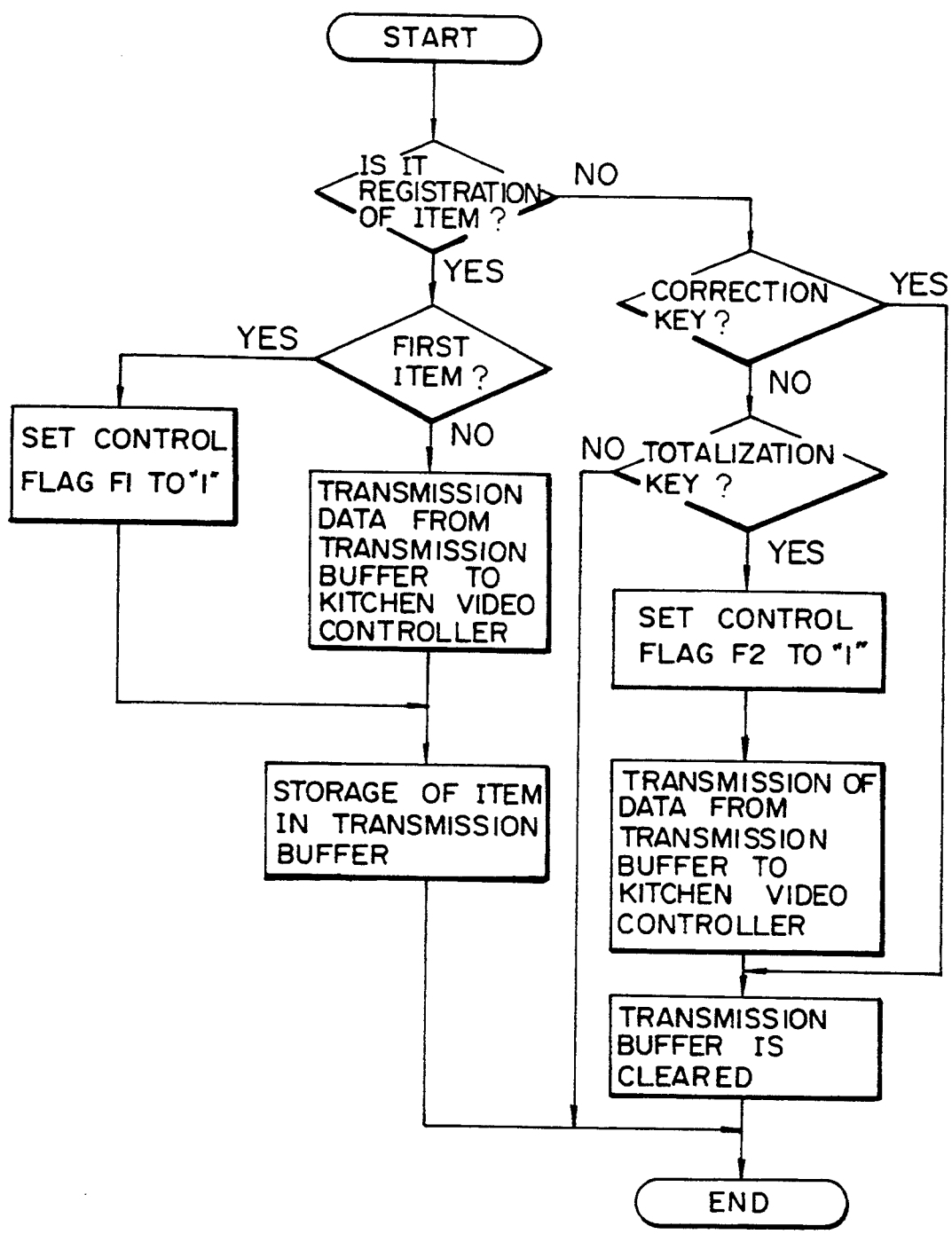
FIG. 24 is a flow chart showing processings for data transmission from the register terminal to the kitchen video controller in the system according to the fourth embodiment.

FIG. 24 shows a flow chart showing an operation of the above-mentioned transmission processing according to the fourth embodiment of the invention. As will be seen from this figure, the fourth embodiment performs substantially the same controlling as the third embodiment other than a difference in the timing of transmission of information to the kitchen video controller 12, as described above.

A fifth embodiment of the present invention will now be described. In this fifth embodiment, it is contemplated to include, in the information displayed on the display device 43 of the kitchen video controller 12 used in the first embodiment, time lapse from a time point of acceptance of an order, in order to make a person in charge of preparation for the order be informed of the waiting time of a customer who gave that order.

Figure 25:
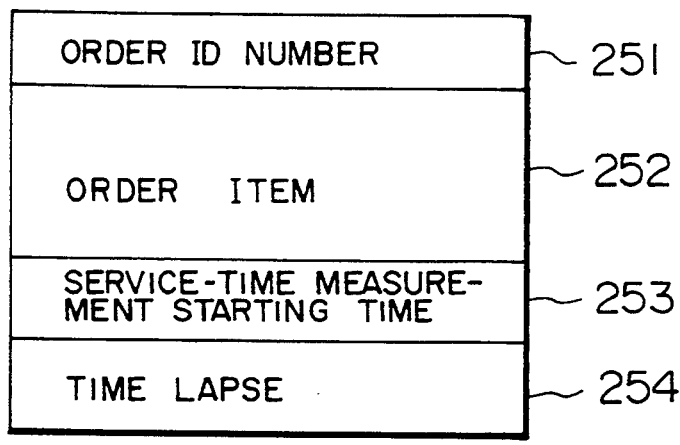
FIG. 25 is a diagram showing a structure of an order file transmitted from the register terminal to the kitchen video controller in the system according to a fifth embodiment of the present invention.
Figure 26:
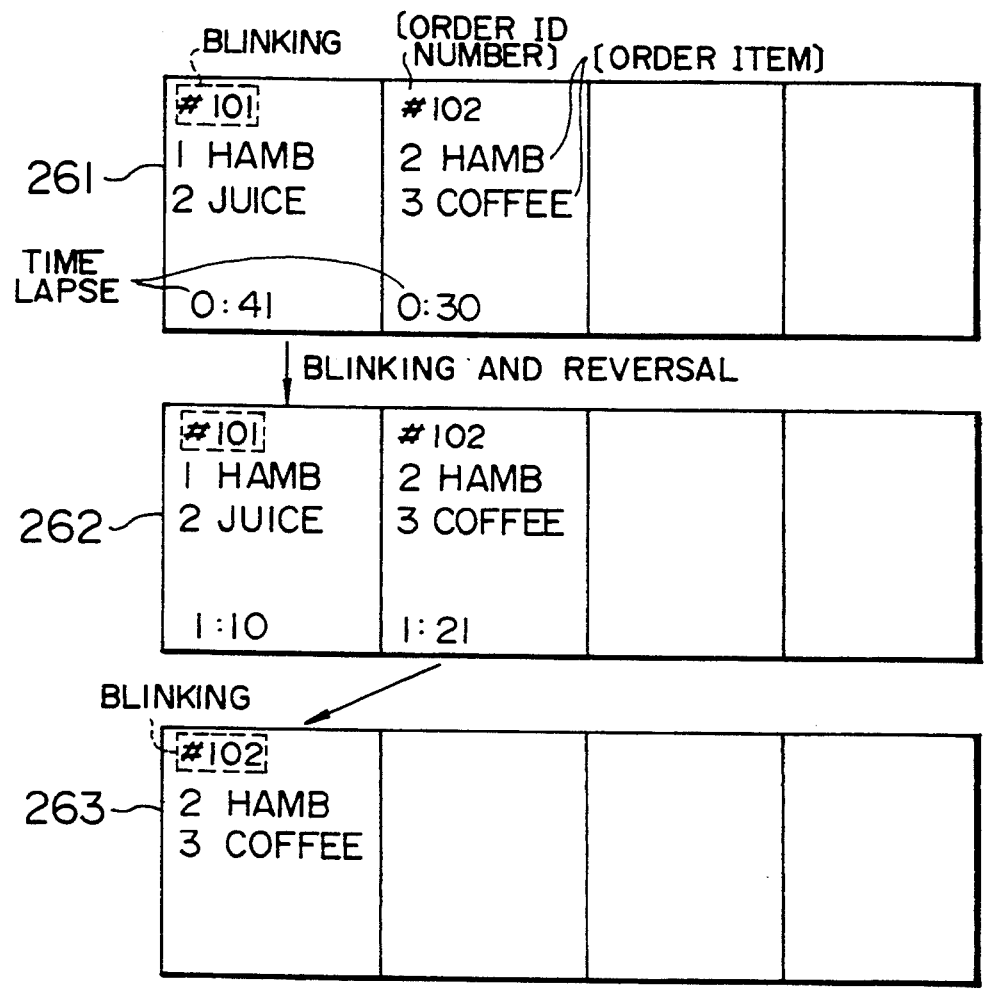
FIG. 26 is a diagram showing an example of a display made by the kitchen video controller in the system according to the fifth embodiment.

FIG. 25 shows a structure of an order transmission file used in the system according to the fifth embodiment of the present invention. In this figure, reference numeral 251 denotes an order ID number storing area, 252 denotes an order item storing area, and 253 denotes a service time measurement starting time storing area. This file additionally includes a time lapse storing area 254 for storing a time lapse which is updated every time an order is displayed on the display device 43 and which results from a subtraction of the service-time measurement starting time point from the current time point. This time lapse information stored in the area 254 is displayed on an order-by-order basis in such a manner as shown in FIG. 26 to keep a person in charge of preparation for the present order informed of the waiting time of the customer. As a modification of the fifth embodiment, it is possible to blink the time lapse information stored in the area 254 shown in FIG. 25 when a previously set desired service time is exceeded, to thereby attract the attention of the person in charge.

A sixth embodiment of the present invention will now be described. In this embodiment, it is intended to output the service time report shown in FIG. 12 and used in the system of the first embodiment for every order destination which is exemplified by in-shop eating/drinking (EAT IN), out-of-shop eating (TAKE-OUT), etc.

Figure 27:
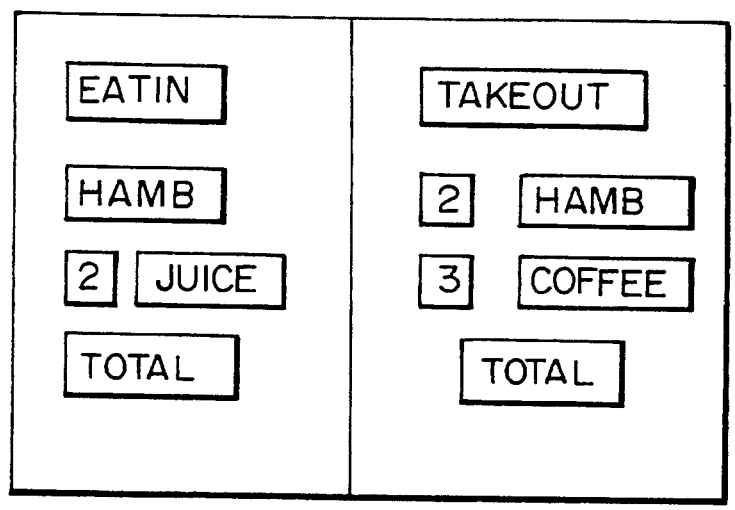
FIG. 27 is a diagram showing an example of a key operation in the register terminal in the system according to a sixth embodiment of the present invention.

FIG. 27 is a diagram for illustrating the item registration in the register terminal 11 of the customer order processing system according to the sixth embodiment. Referring to the figure, ordered items are registered after their respective order destinations have been registered by actuating the key "EAT-IN" or "TAKE-OUT" on the keyboard 21 shown in FIG. 2.

Figure 28:
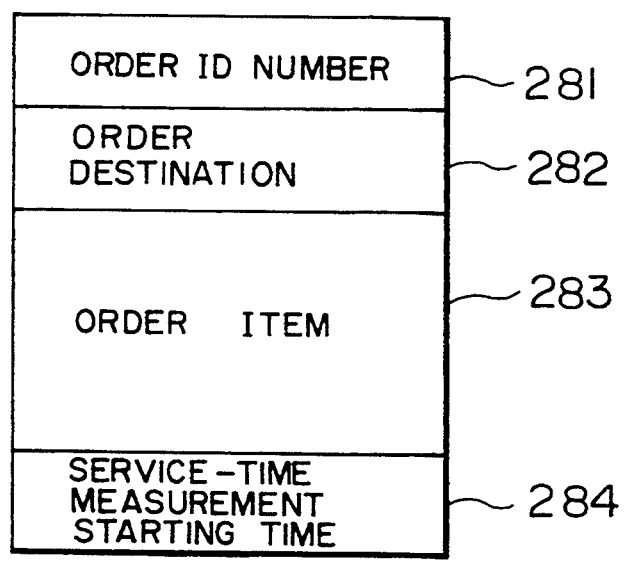
FIG. 28 is a diagram showing a structure of an order file transmitted from the register terminal to the kitchen video controller in the system according to the sixth embodiment.

FIG. 28 shows a structure of a transmission order file adopted in the system according to the sixth embodiment. In this figure, reference numeral 281 denotes an order ID number storing area, 282 denotes an order destination storing area, 283 denotes an order item storing area, and 284 denotes a service time measurement starting time storing area. More specifically, there is stored, in the order destination area 282, order destination information, that is, information about a place to which ordered item(s) should be delivered, at the time of registration of the order item(s) in the register terminal 11. On the other hand, upon reception of this order file from the register terminal 11, the kitchen video controller 12 stores the order reception time in the service-time measurement starting time area 284.

Figures 29, 30:
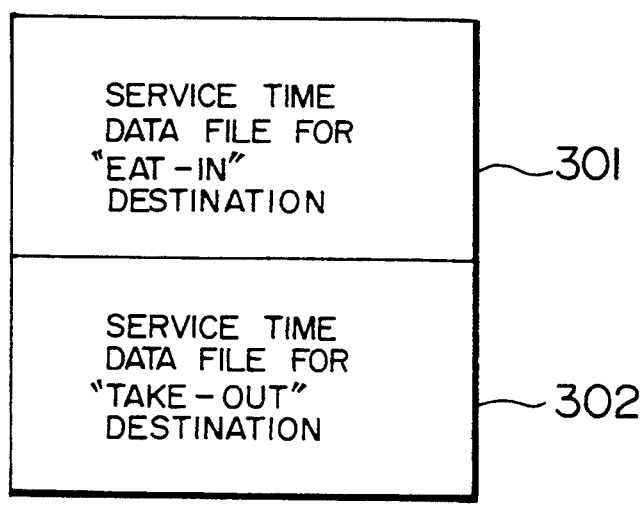
FIG. 29 is a diagram showing an example of a display made by the kitchen video controller in the system according to the sixth embodiment.
FIG. 30 is a diagram showing a structure of a service time data file used in the system according to the sixth embodiment.

FIG. 29 shows a display content of the display device 43 of the kitchen video controller 12 in the customer order processing system according to the sixth embodiment. As shown in FIG. 29, the order destination information in the area 282 in the transmission order file is displayed next to the order ID number.

FIG. 30 shows a structure of the service time data file stored in the memory 25 of the register terminal 11. The register terminal 11 contains service time data files each thereof having the same structure as that of the first embodiment for each order destination. In the same way as the register terminal 11, the kitchen video controller 12 also contains service time data files each thereof having the same structure as that of the first embodiment for each order destinations. The service times are stored in respective destination-based service time data files, in the same way as the first embodiment, corresponding to the order destinations displayed on the display device of the kitchen video controller 12.

Figure 31:
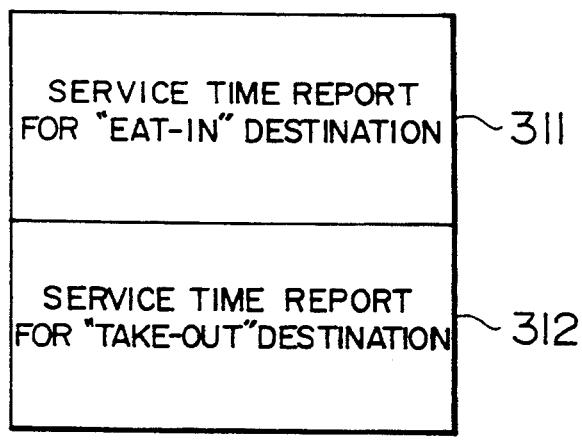
FIG. 31 is a diagram showing an example of a service time report used in the system according to the sixth embodiment.

FIG. 31 shows examples of the service report displayed on the display device 13 of the register terminal 11 in the system according to the sixth embodiment.

In the sixth embodiment, by performing the same report issue processing as described hereinbefore with respect to the first embodiment, data similar to that of the service time report issued in the system of the first embodiment are outputted respectively for every order destination.

Next, referring to FIG. 32, a seventh embodiment of the present invention will be described. The customer order processing system of this embodiment is designed so that the service time report shown in FIG. 12 and described hereinbefore with respect to the first embodiment is issued for every person who is in charge of preparation of orders displayed on the display device 43 in the kitchen video controller.

Figure 32:
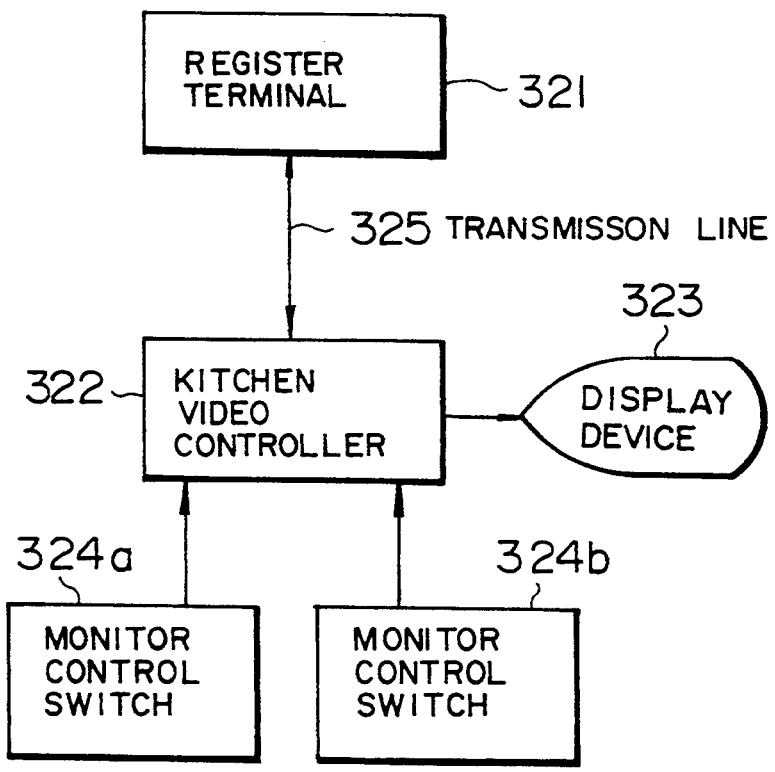
FIG. 32 is a block diagram showing a general arrangement of the customer order processing system according to a seventh embodiment of the present invention.

FIG. 32 shows a system configuration of the seventh embodiment. As shown in FIG. 32, there are connected to the kitchen video controller 322 a plurality of monitor control switches 324 for controlling the display content of the display device 323. The plurality of monitor control switches 324 are designated as respective switch ID numbers 324a, 324b, 324c and so forth and are respectively assigned to the persons who are in charge of preparation for the orders displayed on the kitchen video controller display device 43. These persons in charge will hereinafter be termed order assigned persons, such as order assigned person 1, order assigned person 2, order assigned person 3 and so forth.

Figure 33:
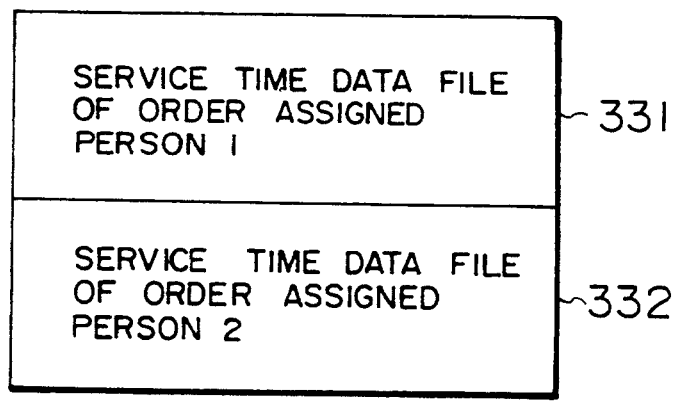
FIG. 33 is a diagram showing an example of the service time data file contained in the register terminal comprised in the system according to the seventh embodiment of the present invention.

FIG. 33 shows a structure of the service time data file stored in the memory 25 of the register terminal 321 in the seventh embodiment shown in FIG. 32. This service time data file has the same structure as that used in the system according to the first embodiment for every order assigned person. Similarly, in the kitchen video controller 322, the service time data file has the same structure as that used in the first embodiment for every order assigned person. Storage of the service time is performed, through the same operation as that of the first embodiment, in the service time data file assigned in correspondence to the switch ID number of an associated monitor control switch 324 which has been used for the erasure of the order displayed on the display device 323.

Figure 34:
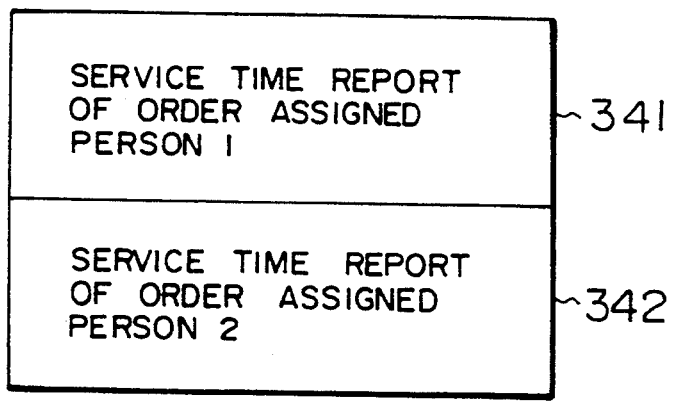
FIG. 34 is a diagram showing an example of a service time report used in the system according to the seventh embodiment.

FIG. 34 shows examples of the service time report displayed on the display device 13 of the register terminal 321 in the system according to the seventh embodiment shown in FIG. 32. As will be seen from this figure, data similar to those of the service time report issued in the system of the first embodiment are outputted to the order assigned persons, respectively, through the same report issuing processing as in the case of the first embodiment.

Next, an eighth embodiment of the invention will be described.

The customer order processing system according to the eighth embodiment differs from the system of the first embodiment shown in FIG. 1 in that a plurality of register terminals are provided together with a plurality of display devices and a corresponding number of monitor control switches for controlling the display contents of the associated display devices, respectively. Both the display devices and the monitor control switches are connected to the kitchen video controller. The orders registered in the respective terminal registers are classified in accordance with order steer information set preliminarily for the respective order items so that the orders are displayed respectively on the relevant display devices of the kitchen video controller in accordance with a display device ID number setting table 37 (which contains information about the relations between the order steer information and the display devices).

Figure 35:
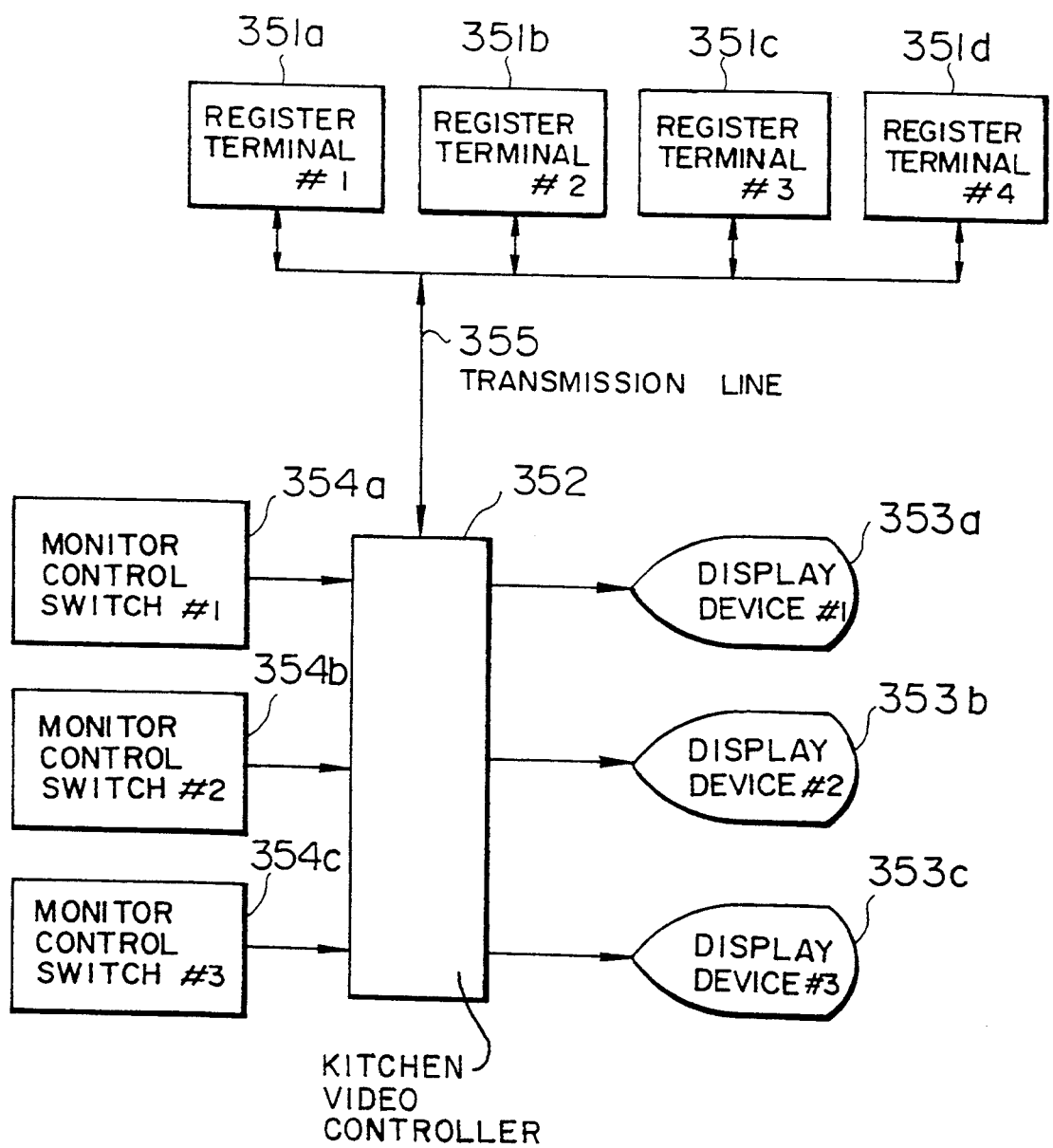
FIG. 35 is a block diagram showing a general arrangement of the customer order processing system according to an eighth embodiment of the present invention.

FIG. 35 shows a system configuration of the customer order processing system according to the eighth embodiment of the invention. As shown in FIG. 35, a plurality of register terminals 351a, 351b, 351c and so forth are connected to the kitchen video controller 352 via a transmission line 355. Further, a plurality of display devices 353a, 353b, 353c and so forth are connected to the kitchen video controller 352 together with a corresponding number of monitor control switches 354a, 354b, 354c and so forth for controlling the display contents of the display devices, respectively.

FIG. 36 shows a structure of an order item setting file which is employed in the system of the eighth embodiment and which is stored in the memory 25 of the register terminal 351. As shown in this figure, in each order item there are set a PLU code 36-1, an item name 36-2, a unit price 36-3 and a steer information flag 36-4 for defining a display device 353 of the kitchen video controller 352 which is to be addressed. Here, the term "PLU code" is an abbreviation of "Price Look-up Code" which is used to store an unit price corresponding to an article code before it is registered in a sheet. More specifically, in the case of the example illustrated in FIG. 36, by inputting "PLU", "#" and "10" through key operations, it is possible to print out or display "coffee at a unit price of 150 yen".

FIG. 37 shows a structure of the display device ID number setting table 37 used in the system of the eighth embodiment. This table 37 is stored in the memory 25 of the register terminal 351. Referring to FIG. 37, it is seen that the display device ID numbers 37b of the kitchen video controller 352 are set in correspondence to the steer information flags 37a, respectively.

Figure 38:
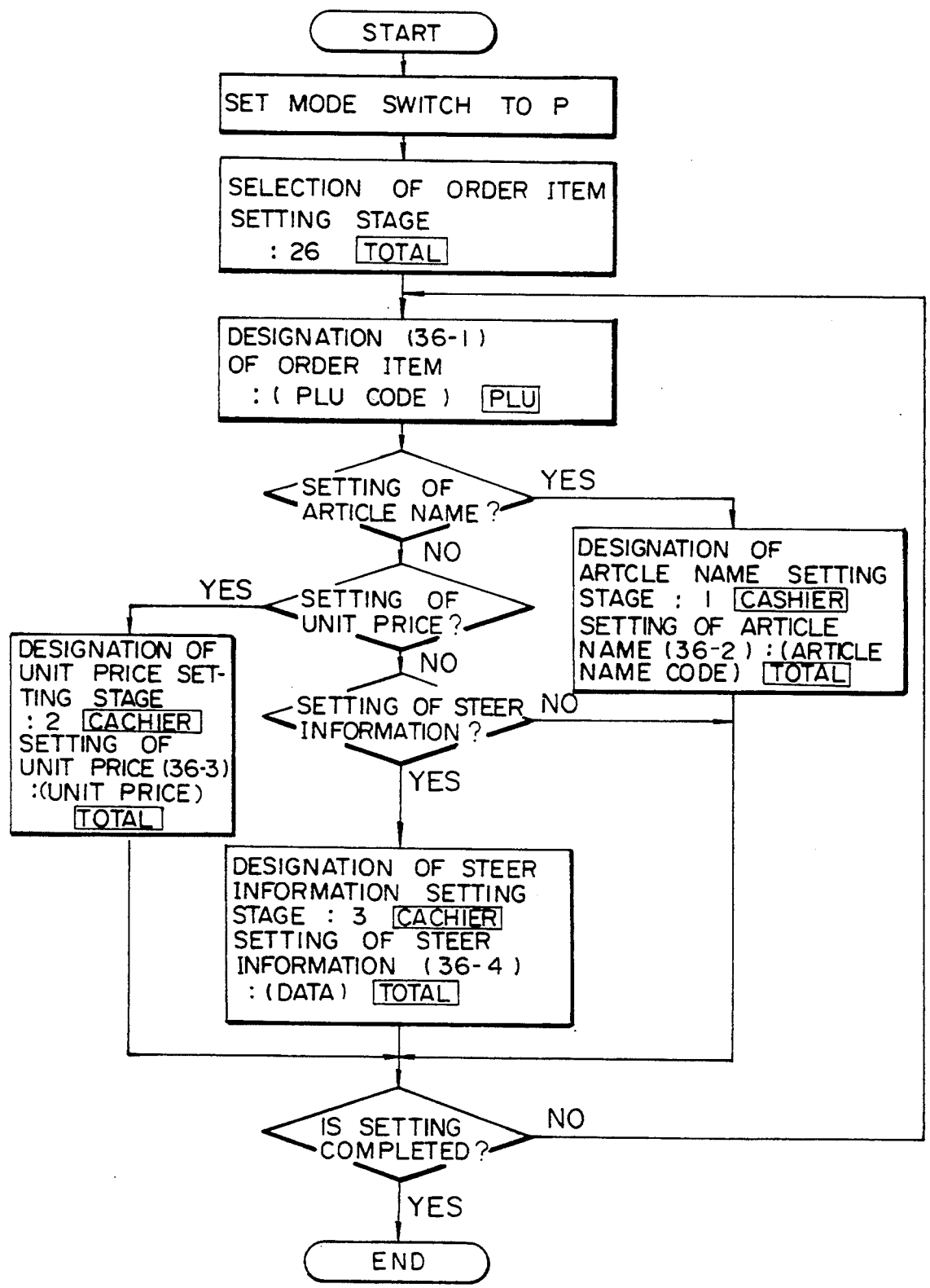
FIG. 38 is a flow chart showing order item setting processings executed in the system according to the eighth embodiment.

FIG. 38 is a flow chart showing processing steps for setting the order item setting file in the system of the eighth embodiment. More specifically, by way of the processing steps shown in FIG. 8, the item or article name 36-2, the unit price 36-3, and the steer information flag 36-4 for designating a display device of the kitchen video controller 352 are set in correspondence to the respect PLU codes 36-1.

Figure 39:
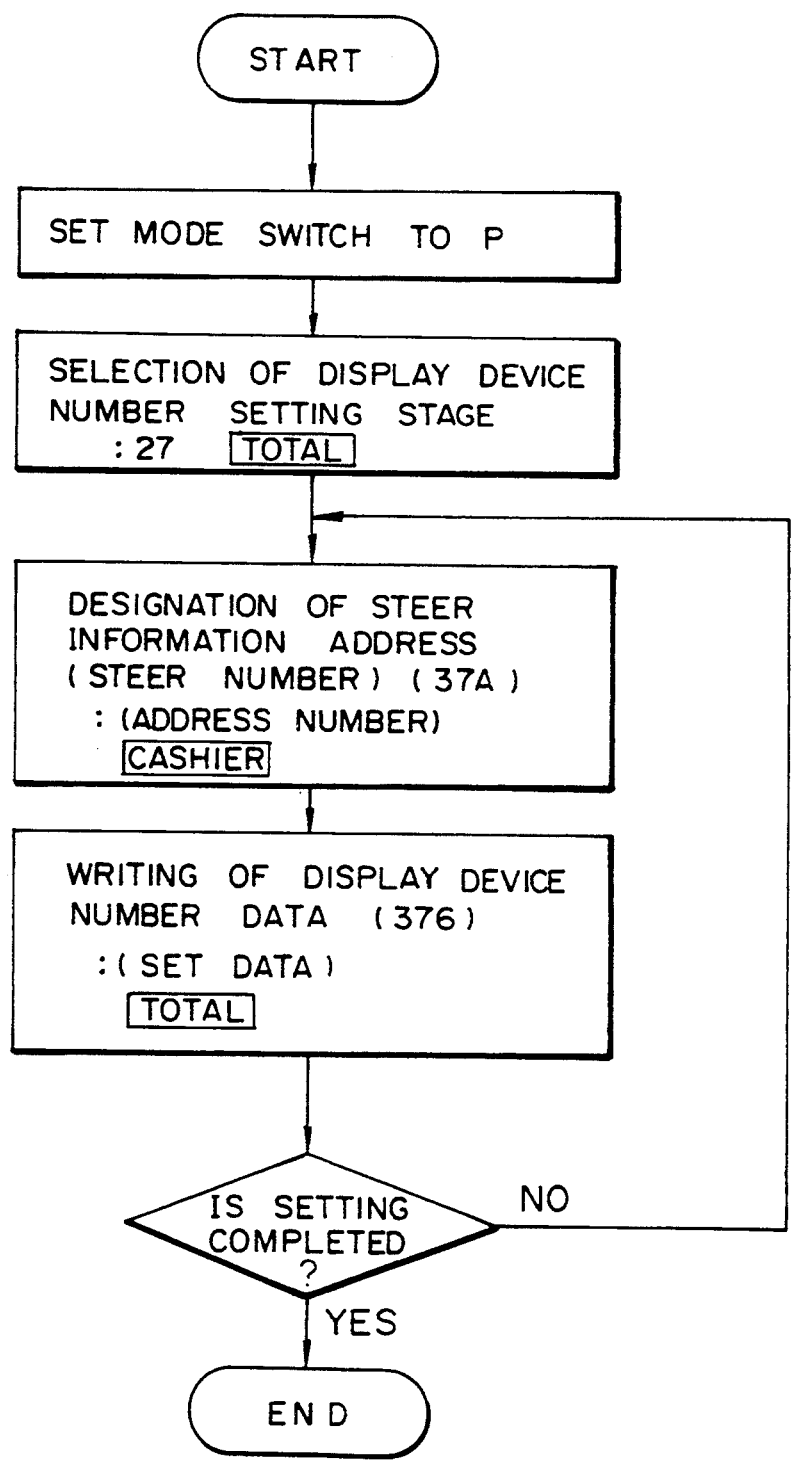
FIG. 39 is a flow chart showing display device ID number setting processings expected in the system according to the eighth embodiment.

FIG. 39 shows processing step for setting the display device ID number setting table. It can be seen that the display device ID numbers 37b of the kitchen video controller 352 are set in correspondence to the steer information flags 37a, respectively.

FIGS. 40A, 40B, 40C and 40D show an example of the structure of an order registered in the register terminal 351 and that of transmission items (40b, 40c and 40d shown in FIGS. 40B, 40C and 40D, respectively) used for transmitting the order to the kitchen video controller 352 by classifying the order in accordance with the steer information set for respective order items. More specifically, the orders having the structure as registered in the register terminal 351 and as shown in FIG. 40A are classified in accordance with the steer information "STEER" set preliminarily for the individual order items, respectively. Thus, the order item, for which the steer information 1 (STEER 1) has been set, is assembled to have a structure of the transmission item file shown in FIG. 40B. Similarly, the order items, for which steer information 2 (STEER 2) and steer information 3 (STEER 3) have been set, are assembled to have respective structures of the transmission item files shown in FIGS. 40C and 40D. In the case of the examples illustrated by FIGS. 40A, 40B, 40C and 40D, the information "STEER 1" is set for all the order items, the information "STEER 2" being set for drinks, while, the information "STEER 3" being set for hamburger which requires cooking preparation.

Figure 41:
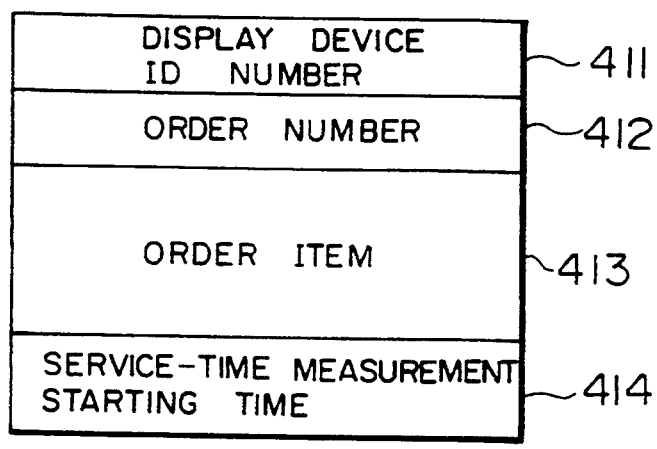
FIG. 41 is a diagram showing a structure of an order file transmitted from the register terminal to the kitchen video controller in the system according to the eighth embodiment.

FIG. 41 shows a structure of a transmission order file for transmitting an order from the register terminal 351 to the kitchen video controller 352 in the system according to the eighth embodiment shown in FIG. 35. In this figure, reference numeral 411 denotes a display device ID number storing area, 412 denotes an order ID number storing area, 413 denotes an order item storing area, and 414 denotes a service-time measurement starting time storing area, respectively. Upon reception of an order file from the register terminal 351, the kitchen video controller 352 stores the reception time in the service-time measurement starting time area 414 shown in FIG. 41. The transmission item files 40b, 40c and 40d shown in FIGS. 40B, 40C and 40D, respectively, are stored in the order item storing area 413. The display device ID numbers corresponding to the respective steer information are selected from the display device ID number setting table shown in FIG. 37, and, after they are stored in the display device ID number storing area 411, they are transmitted to the kitchen video controller 352.

Figure 42:
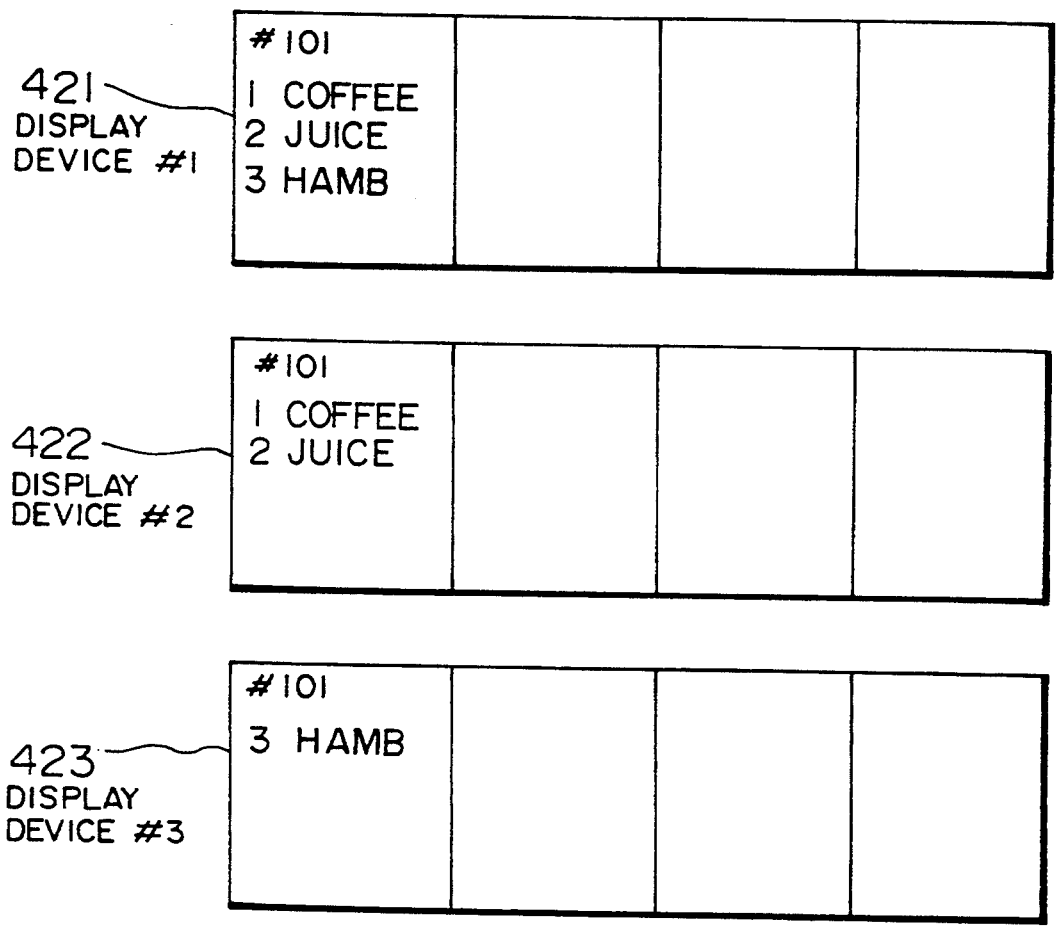
FIG. 42 is a diagram showing examples of displays made by the kitchen video controller in the system according to the eighth embodiment.

FIG. 42 shows examples of displays on the display devices 353a, 353b and 353c of the kitchen video controller in the system according to the eighth embodiment shown in FIG. 35. The order items contained in the transmission item files 40b, 40c and 40d are displayed on the display devices numbered "1", "2" and "3", respectively, in such a manner as shown in FIG. 42. As can be seen, the preparation for drinks is indicated by the display device numbered "2", while the preparation for hamburger, which requires cooking preparation, is indicated by the display device numbered "3". Thus, the order can be prepared distinctly and separately. Further, since the display device 1 displays all items for every order, the information displayed on the display device 1 can be used in preparing a tray or as a back display.

Figure 43:
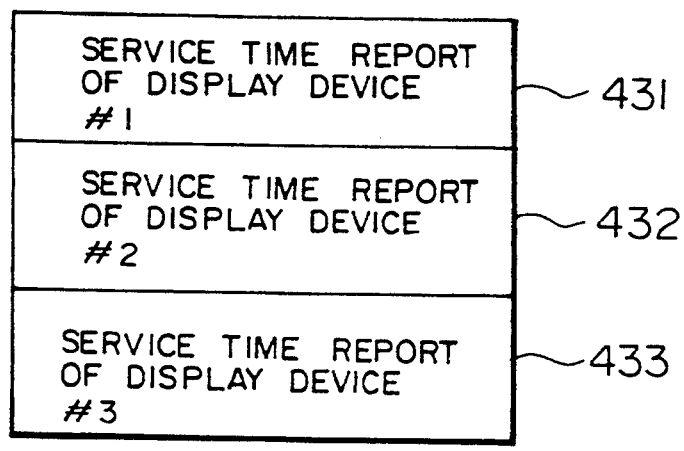
FIG. 43 is a diagram showing examples of service time reports used in the system according to the eighth embodiment.

FIG. 43 shows examples of the service time reports displayed on the display devices of the register terminals 351a, 351b and 351c, respectively, in the customer order processing system of the eighth embodiment shown in FIG. 35. In the system according to this embodiment, as the same report issue processings as those of the first embodiment are performed, the same data as those of the service time report in the system of the first embodiment are outputted respectively to the display devices 353 of the kitchen video controller 352 for every display device ID number. Thus, it can be understood that the present service reports for every display device ID number are the service reports assembled respectively for every transmission items in accordance with respective steer information.

A ninth embodiment of the invention will be described.

The customer order processing system according to the ninth embodiment is implemented to have a structure substantially similar to the eighth embodiment except that the customer orders registered in the register terminal and displayed on a plurality of display devices 353a, 353b and 353c of the kitchen video controller 352 shown in FIG. 35 are backed up by back-up displays provided by the contents of the display device ID number setting table 37 shown in FIG. 37 (i.e., the table showing the relations between the steer information and the display devices).

Figure 44:
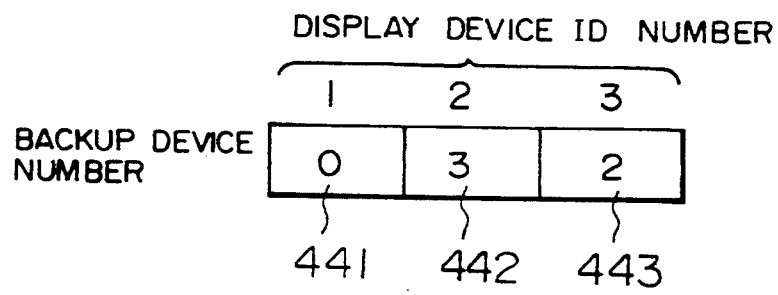
FIG. 44 is a diagram showing a structure of a display device backup ID number setting table used in the system according to a ninth embodiment of the present invention.

FIG. 44 shows a structure of a display device back-up number setting table employed in the system according to the ninth embodiment. This table is stored in the memory 25 of the register terminal 351. More specifically, referring to FIG. 44, the ID numbers of the back-up display devices are set in the areas 441, 442 and 443 in correspondence to the ID numbers 1, 2 and 3 of the associated display devices (to be backed up), respectively, through processings similar to the setting operation of the display device ID number setting table shown in FIG. 39.

Figure 45:
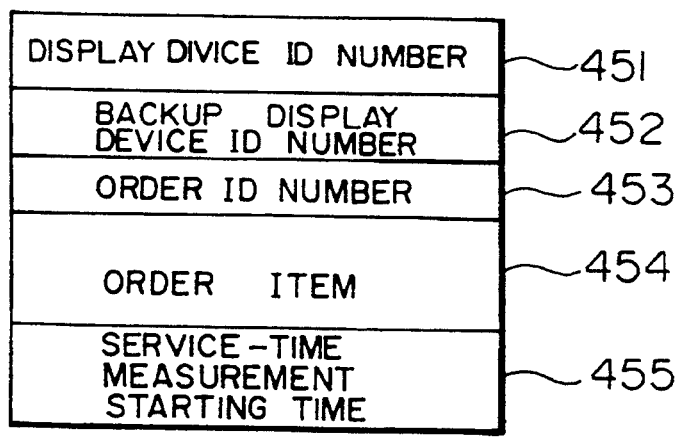
FIG. 45 is a diagram showing a structure of an order file transmitted from the register terminal to the kitchen video controller in the system according to the ninth embodiment.

FIG. 45 shows a structure of the transmission order file in the system according to the ninth embodiment which is used to transmit a customer order from the register terminal 351 to the kitchen video controller 352. In this figure, reference numeral 451 denotes a display device ID number area, 452 denotes a back-up display device ID number area, 453 denotes an order ID number area, 454 denotes an order item area, and 455 denotes a service-time measurement starting time area, the above areas storing corresponding information, respectively.

FIGS. 46A and 46B show examples of displays indicated on the display devices 353a, 353b and 353c of the kitchen video controller 352 in the system according to the ninth embodiment. As in the case of the eighth embodiment (refer to FIG. 40A), it is assumed that the steer information "STEER 1" is set for all items of the order, the steer information "STEER 2" being set for drinks, and the steer information "STEER 3" being set for hamburgers which require cooking preparation. So far as the order ID numbers #101 up to #104 are concerned, the order items are displayed on the respective display devices, being classified in a similar manner as the eighth embodiment, since the display capacity of each of the display devices is not exceeded. It is now assumed that a customer order of the order ID number #105 shown in FIG. 46B, which requests three hamburgers as indicated by "3 HAMB", is issued. Intrinsically, this order #105 should be displayed on the display devices #1 and #3, respectively, because the order item [3 HAMB]is set for "STEER 1" and "STEER 3" as shown in FIG. 36 and the steer information "STEER 1" and "STEER 3" are assigned to the display devices #1 and #3, respectively, as shown in FIG. 37. However, as seen from FIG. 46A, no area is available to display the order #105 on the display devices #1 and #3, since they are occupied by the displays of the customer orders #101 to #104. The ninth embodiment of the present invention is designed to cope with the situation described above. To this end, there is provided the display device back-up number setting table as shown in FIG. 44. In this table, the display device #1 is not supported by any back-up device, as indicated by "0" in FIG. 44, while, the display device #3 is backed-up by the display device #2, as shown in the area 443 in FIG. 44. According to the structure of the transmission order file shown in FIG. 45, the back-up display device ID number is also sent to the kitchen video controller 352. Thus, the order numbered #105 (i.e., "3 HAMB") can be displayed in the available fourth display area of the display device #2, as shown in FIG. 46A. The ninth embodiment of the present invention is advantageous in that preparations for the customer order can be greatly accelerated greatly.

A tenth embodiment of the invention will be described next.

The customer order processing system according to the tenth embodiment differs from the first embodiment in that an order recall key is provided in the monitor control switch of the kitchen video controller in the system of the first embodiment so that an order once erased by manipulating the clear key can be recalled by the use of the order recall key.

Figure 47:
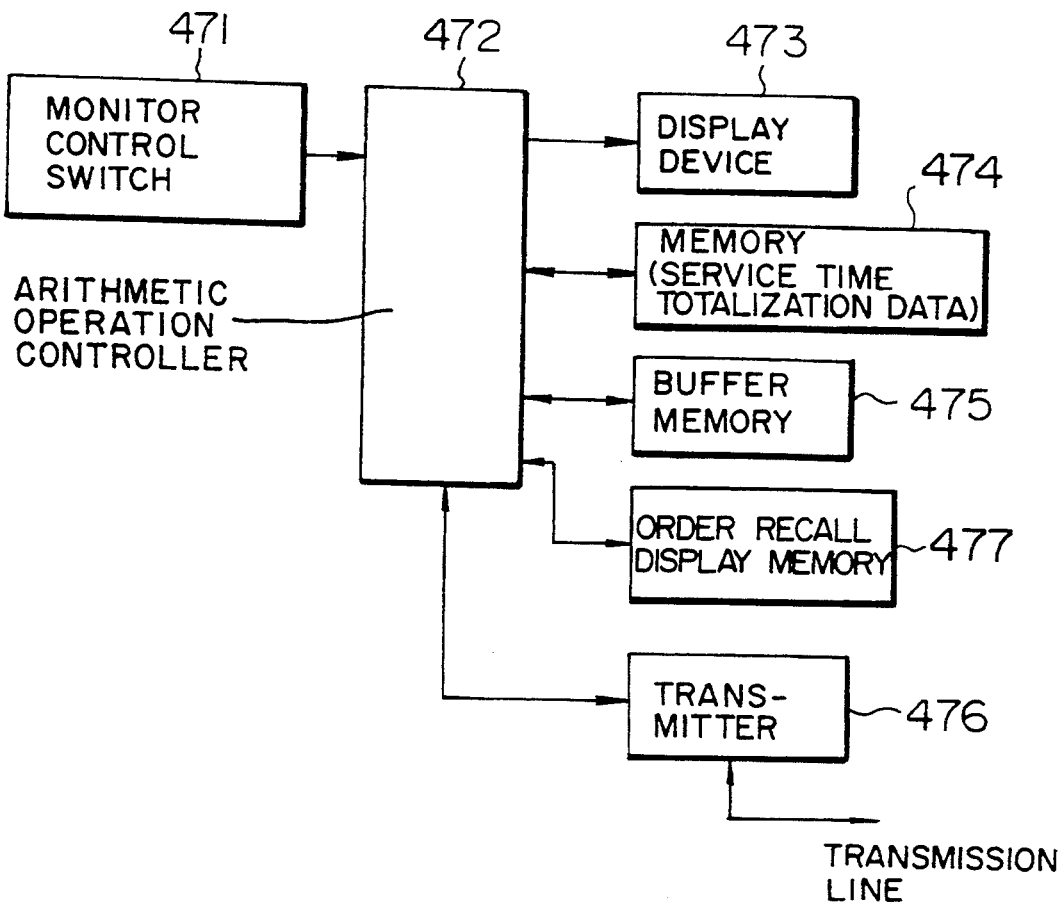
FIG. 47 is a block diagram showing a structure of a kitchen video controller comprised in the customer order processing system according to a tenth embodiment of the present invention.
Figure 48:
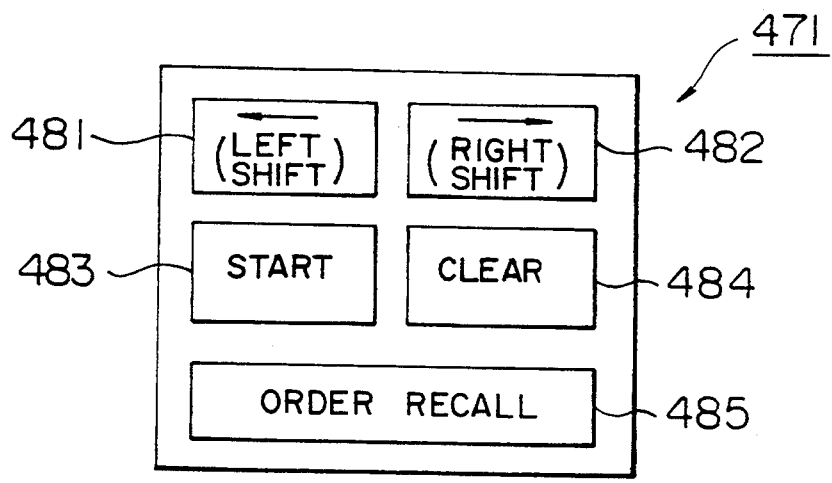
FIG. 48 is an external view of a monitor control switch comprised in the system according to the tenth embodiment.

FIG. 47 shows an arrangement of the kitchen video controller in the system according to the tenth embodiment. In the figure, reference numeral 471 denotes the monitor control switch in which an order recall key is provided in addition to a right shift key, a left shift key, a start key and a clear key, as shown in FIG. 48. Upon actuation of any one of these keys, a corresponding key signal is generated and supplied to an arithmetic operation control apparatus 472. In addition to this arithmetic operation control apparatus 472, a display device 473, a memory 474, a buffer memory 475 and a transmitter 476, all of which may be the same constituent components as those of the first embodiment, are provided. Also provided is an order recall display memory 447, which is connected to the arithmetic operation control apparatus 472.

Figure 49A:
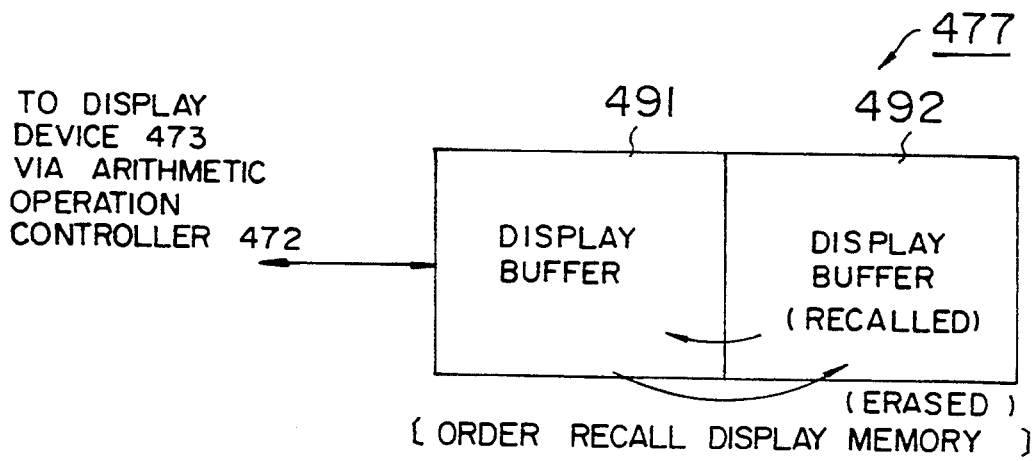
FIGS. 49A and 49B are diagrams showing structures of a memory for an order recall display and a display buffer, respectively, in the system according to the tenth embodiment.
Figure 49B:
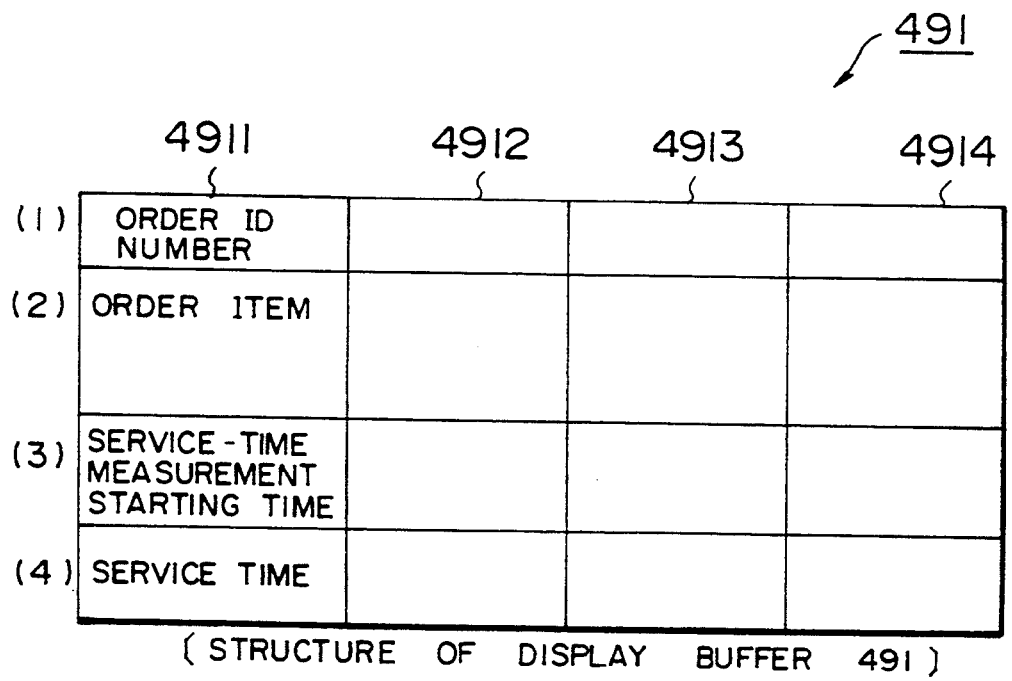

FIGS. 49A and 49B illustrate a structure of the order recall display memory 477. As can be seen from FIG. 49A, the order recall display memory 477 is constituted by a serial connection of two display buffers 491 and 492 in a FIFO (first-in, first-out) configuration, wherein each of the display buffers has a capacity for accommodating four orders in correspondence to the display capacity of the display device 473, as shown in FIG. 49B. In operation, upon actuation of the clear key 484 of the monitor control switch 471 shown in FIG. 48, the order display information on the display device 473 at that time is stored in the first stage display buffer 491 of the order recall display memory 477, and then the display information on the display device 473 for that customer order is erased. At that time, the preceding display information stored in the display buffer 491 is shifted into the display buffer 492 upon storage of new display information in the buffer 491. In this way, the updated display information for two images at the time of the latest erasure can always be held in the order recall display memory 477 sequentially on a time series basis.

FIG. 49B shows a structure of the order recall display buffer 491. In this figure, reference numeral 4911-(1) denotes an order ID number storing area, 4911-(2) denotes an order item storing area, 4911-(3) denotes a service-time measurement starting time storing area, and 4911-(4) denotes a service time storing area. The storing areas 4911-(1) to 4911-(3) serve to store the respective information described hereinbefore, while, the storing area 4911-(4) serves to store a service time added to the service time report file when the order information once stored in the buffer 491 has been erased.

More specifically, upon operation of the order recall key 485 of the monitor control switch 471, the contents of the first stage display buffer 491 of the order recall display memory 477 shown in FIG. 49A are transferred to the display device 473 to thereby perform recall display of an erased order on the display device 173. At the same time, in the case of an order once erased and recalled on the display, the service time 4911-(4) of that order which has been added to the service time report file upon erasure of that order is corrected by subtracting the service time 4911-(4) from the service time report file at the time of performing the recall display to thereby restore to the state before the erasure. In that case, the display information in the display buffer 492 is shifted back into the display buffer 491 correspondingly. In this way, by actuating the order recall key 485 twice, the orders once erased can be recalled onto the display device 473 retroactively up to the order before last. Thus, this function may be utilized effectively in restoring incorrectly stored information to a correct state when a customer order has been erased by accident or for any other undesirable reason.

A description will next be made of an eleventh embodiment of the present invention.

The eleventh embodiment contemplates to develop the system of the first embodiment to be applicable to a so-called drive-through shop where a passenger customer in a vehicle can order and purchase an article without the need to get out of the vehicle, wherein the service-time measurement starting time is determined on the basis of a vehicle position detection signal detected at a predetermined vehicle position.

Figure 50:
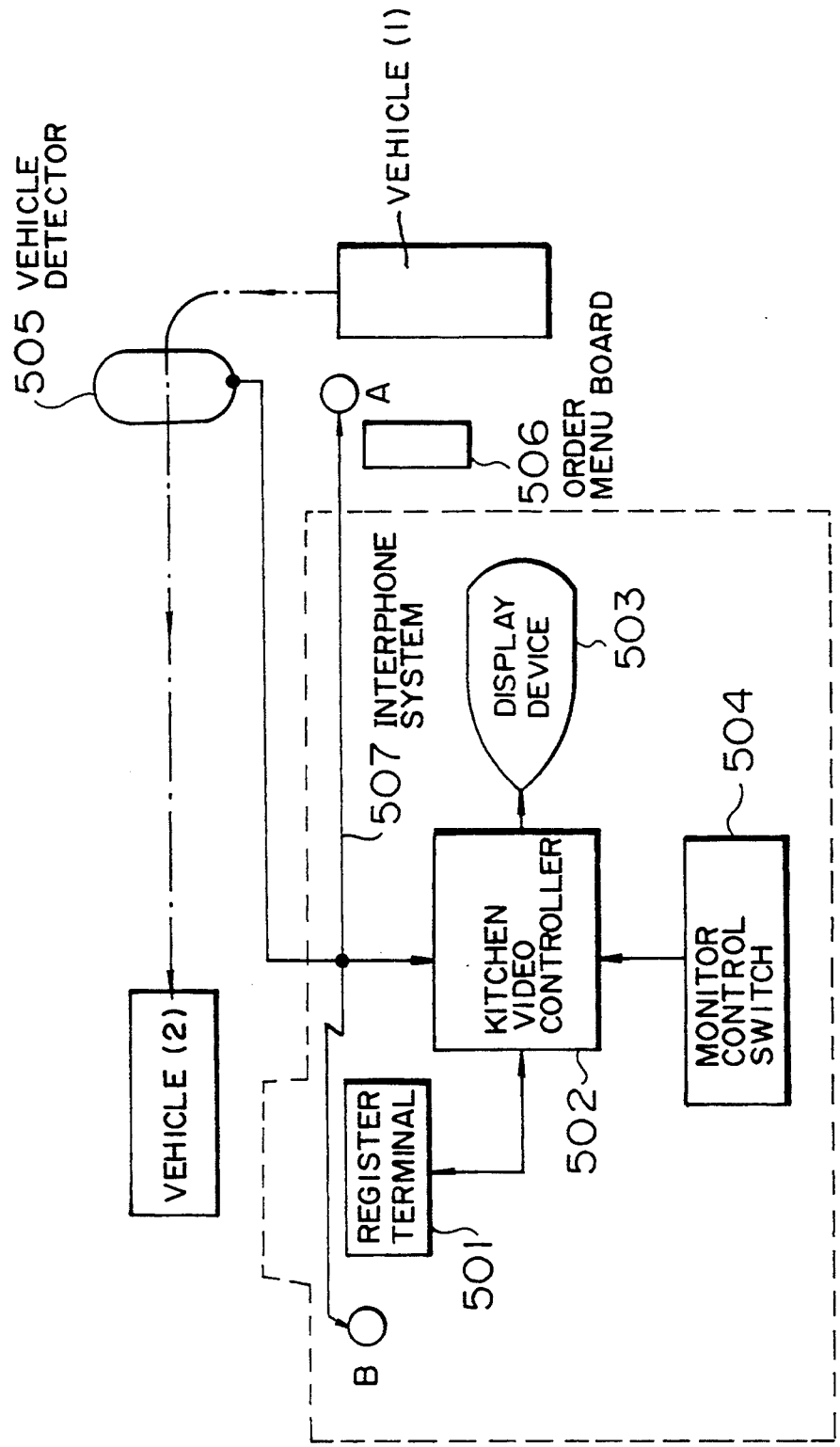
FIG. 50 is a block diagram showing a general arrangement of a customer order processing system for use in a so-called drive-through shop according to an eleventh embodiment of the present invention.

FIG. 50 shows an arrangement of the customer order processing system according to the eleventh embodiment which is designed for use in a drive-through shop. In the figure, reference numeral 501 denotes a register terminal, 502 denotes a kitchen video controller, 503 denotes a display device and 504 denotes a monitor control switch. A vehicle can park at a position "VEHICLE(1)", and a passenger in the vehicle can select and order an article to be purchased by looking at an order menu board 506. At that timer the name of an ordered item is transmitted to an operator location B of the register terminal 501 from a location A by way of a medium of an interphone system 507. Thus, the operator inputs the order to the register terminal 501. The vehicle from which the order has been issued moves to a vehicle position "VEHICLE(2)" to receive the ordered article. In that case, at a position apart from the vehicle position "VEHICLE(1)" by a predetermined distance in the forward direction, the vehicle is detected by a vehicle detector 505, and a detection signal is then supplied to the kitchen video controller 502. In the kitchen video controller 502, the time of reception of the vehicle detection signal from the vehicle detector 501 is stored in the service-time measurement starting time area 193 of the transmission order file shown in FIG. 19.

Figure 51:
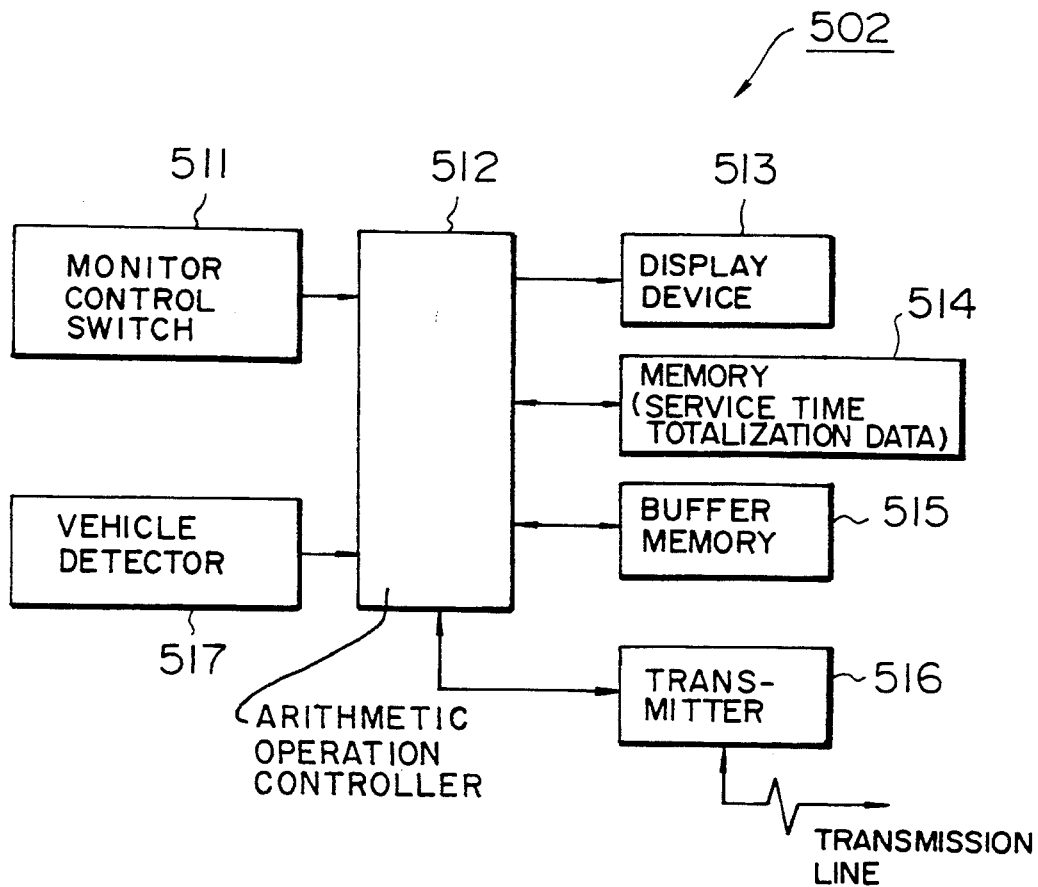
FIG. 51 is a block diagram showing a structure of a kitchen video controller comprised in the system according to the eleventh embodiment.

FIG. 51 shows an arrangement of the kitchen video controller 502 in the system according to the eleventh embodiment. As seen from this figure, the kitchen video controller 502 is composed of a monitor control switch 511, an arithmetic operation control apparatus 512, a display device 513, a memory device 514, a buffer memory 515, and a transmitter 516, all of which have the same structure as the corresponding components of the first embodiment, respectively. Additionally, a vehicle detector 517, which is implemented for detecting the vehicle on the basis of an electromagnetic induction principle or the like, is connected to the arithmetic operation control apparatus 512. The vehicle detector 517 is installed at the position of the vehicle detector 505 shown in FIG. 50. The vehicle detection signal outputted from the vehicle detector 517 is inputted to the kitchen video controller 502 and is utilized to control entry of the corresponding time information in the service-time measurement starting time area of the transmission order file shown in FIG. 19. Except for the control of the entry in the service-time measurement starting time area 193 of the transmission order file shown in FIG. 19 by the use of the vehicle detection signal from the vehicle detector 517, the service time report is issued through the same processings as those of the first embodiment.

A twelfth embodiment of the present invention will be described hereunder.

The customer order processing system according to the twelfth embodiment is also developed from the system of the first embodiment so that the system can be installed in a so-called drive-through shop where a passenger in a vehicle can order and purchase an article while the passenger stays in the vehicle. In the case of the system according to the first embodiment, the service time is measured as a time elapsed from the reception of an order until the order displayed on the display device 43 of the kitchen video controller 12 shown in FIG. 4 has been erased by the use of the monitor control switch 41. By contrast, in the system according to the twelfth embodiment, the measurement of the service time is effected by using a vehicle position detection signal generated by the detection of the movement of the vehicle after an order has been issued therefrom.

Figure 52:
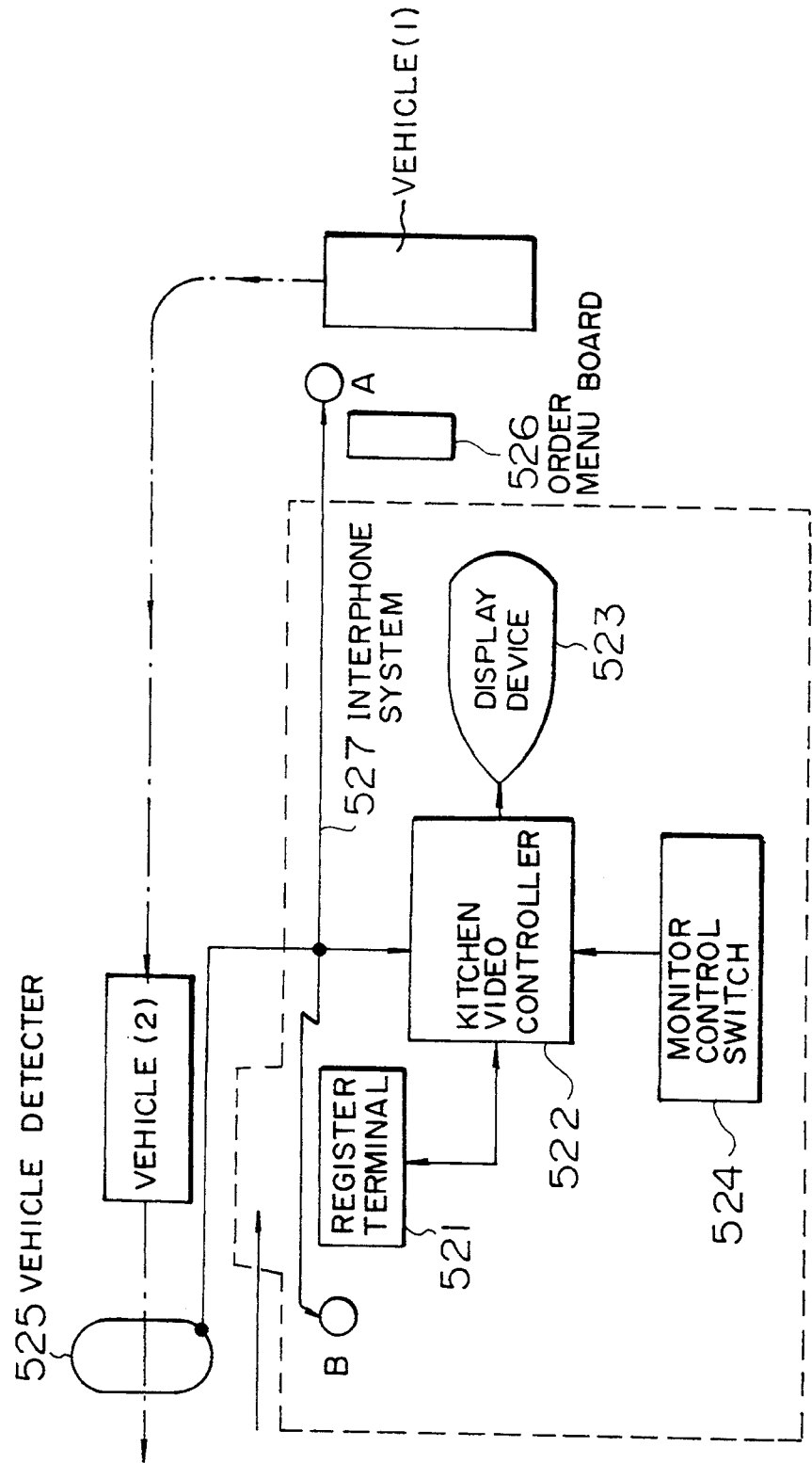
FIG. 52 is a block diagram showing a general arrangement of a customer order processing system for use in a drive-through shop according to a twelfth embodiment of the present invention.

FIG. 52 shows a general arrangement of the customer order processing system according to the eleventh embodiment which is installed in a drive-through shop. In this figure, reference numeral 521 denotes a register terminal, 522 denotes a kitchen controller, 523 denotes a display device, and 524 denotes a monitor control switch. A passenger, who stays within a vehicle parked at a vehicle position "VEHICLE(1)", selects an article, which the passenger intends to purchase, in an order menu board 526 and issues an order inclusive of the selected item. The order is then transmitted from a location A to an operator of the register terminal 521 at a location B through an interphone system 527. The operator inputs the order in the register terminal 521. After having issued the order, the vehicle moves to a car position "VEHICLE(2)" where the passenger receives the desired article. In that case, at a vehicle position apart from the position "VEHICLE(2)" by an appropriate distance in the forward direction, the vehicle is detected by the vehicle detector 525, and an output detection signal therefrom is transmitted to the kitchen video controller 522. In the kitchen video controller 522, the service-time measurement starting time stored in the area 193 of the transmission order file shown in FIG. 19 is subtracted from the time of reception of the detection signal from the vehicle detector 525 to thereby determine the service time for the order.

Figure 53:
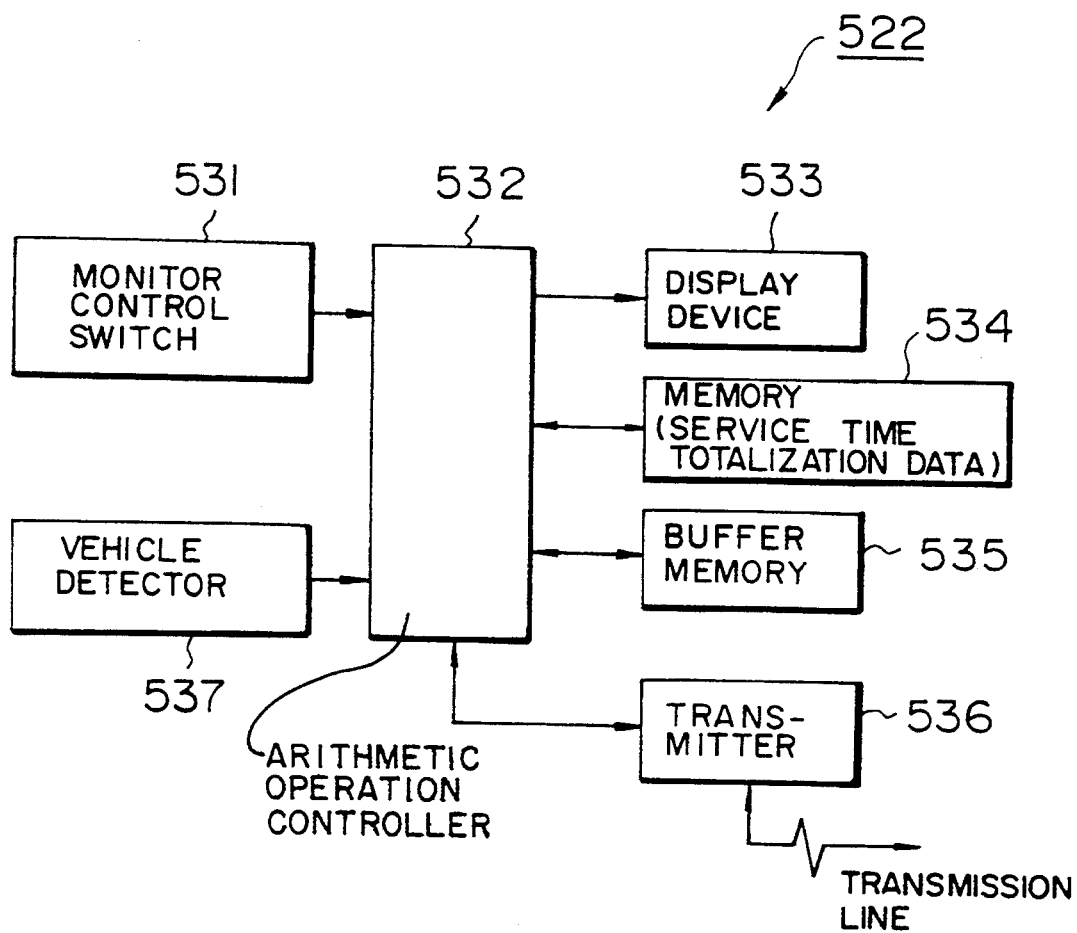
FIG. 53 is a block diagram showing a structure of a kitchen video controller comprised in the system according to the twelfth embodiment.

FIG. 53 shows a structure of the kitchen video controller in the system according to the twelfth embodiment. As seen from this figure, in addition to a monitor control switch 531, an arithmetic operation control apparatus 532, a display device 533, a memory device 534, a buffer memory 535 and a transmitter 536, all of which are identical to the corresponding components of the first embodiment, are provided. Also included is a car detector 537 operating on the basis of an electromagnetic induction principle or the like and connected to the arithmetic operation control apparatus 532. The vehicle detector 537 is located ahead of and close to the position of the vehicle detector 525 shown in FIG. 52 and detects a vehicle at this position. An output detection signal from the vehicle detector 537 is then supplied to the kitchen video controller 522. In the kitchen video controller 522, the service-time measurement starting time stored in the storing area 193 of the transmission order file shown in FIG. 19 is subtracted from the time when the vehicle has been detected to thereby determine the service time for the order. A service time report is made through the same processings as in the system of the first embodiment except for the service-time measurement based on the detection signal produced by the vehicle detector 537.

A description will now be made of a thirteenth embodiment of the invention.

In the customer order processing system according to the thirteenth embodiment, the kitchen video controller of the first embodiment is modified so as to utilize a wireless communication in performing signal transmission between the monitor control switch and the arithmetic operation control apparatus, through the medium of an infrared ray, an electromagnetic wave or the like.

Figures 54, 55:
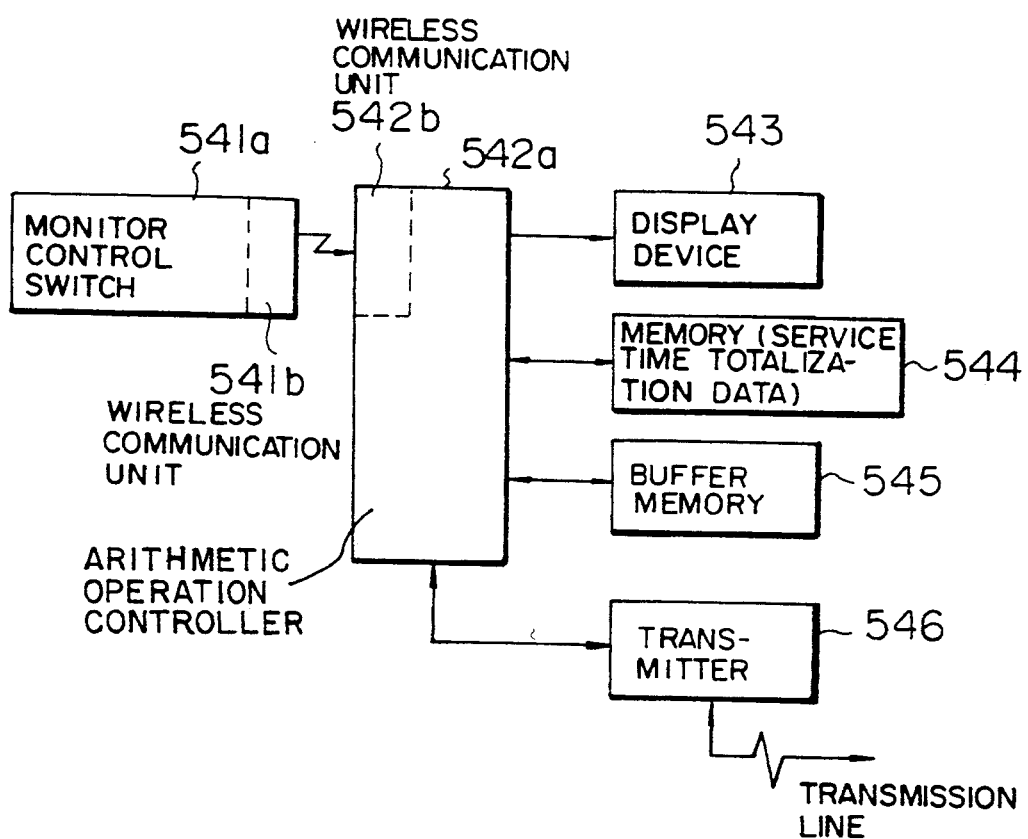
FIG. 54 is a block diagram showing a structure of a kitchen video comprised in the customer order processing system controller according to a thirteenth embodiment of the present invention.
FIG. 55 is a diagram showing a structure of a setting file for setting order items in the system according to a fourteenth embodiment of the present invention.

FIG. 54 shows a general arrangement of the kitchen video controller 12 according to the thirteenth embodiment. In this figure, reference numeral 541 denotes a monitor control switch which incorporates a wireless communication unit 541b for transmitting switch information through a wireless communication unit 542b incorporated in the arithmetic operation control apparatus 542. The other components of the kitchen video controller 12 including a display device 543, a memory device 544, a buffer memory 545, and a transmitter 546 are identical with those of the first embodiment. With the arrangement of the kitchen video controller according to the thirteen embodiment, the service time report is issued through the same processings as those of the first embodiment except that the switch information of the monitor control switch 541 is transmitted to the arithmetic operation control apparatus 542 by way of wireless communication.

Finally, a fourteenth embodiment of the present invention will be described.

The customer order processing system according to this embodiment differs from the first embodiment in that the display device of the kitchen video controller in the system of the first embodiment is formed of a display device capable of generating color images so that order items are displayed in colors by using color information which has been preliminarily set for respective items.

FIG. 55 shows a structure of an order item setting file used in the system according to the fourteenth embodiment which file is stored in the memory 25 of the register terminal 11. In the figure, each order item area includes a PLU code area 551, an item name area 552, a unit price area 553, and display color data area 554 for determining the colors of items displayed on the display device of the kitchen video controller.

Figure 56:
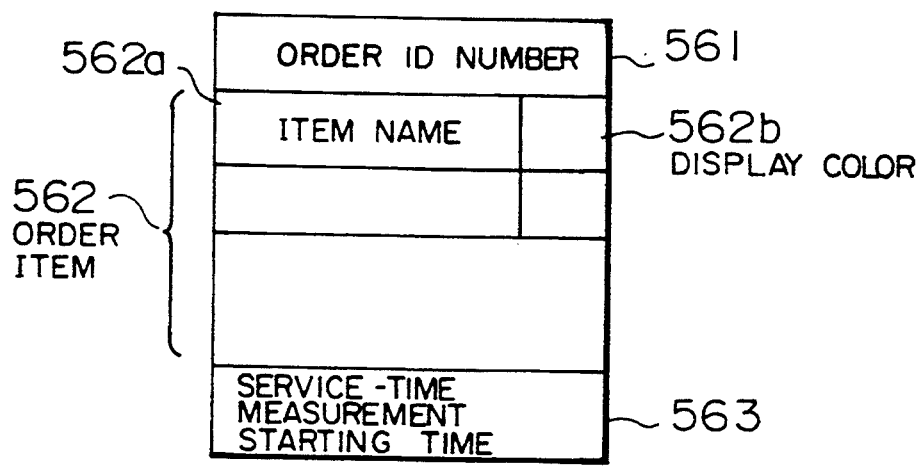
FIG. 56 is a diagram showing a structure of an order file transmitted from the register terminal to the kitchen video controller in the system according to the fourteenth embodiment.

FIG. 56 shows a structure of a transmission order file 56 used for transmitting a customer order from the register terminal 11 to the kitchen video controller 12 in the system according to the fourteenth embodiment. This transmission order file includes an order ID number area 561, an order item area 562, a service-time measurement starting time area 563, which store respective associated information, and in which each order item area 562 includes an item name area 562a and a display color area 562b.

Figure 57:
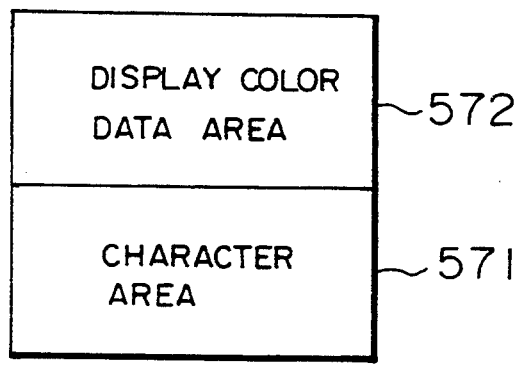
FIG. 57 is a diagram showing a structure of a video RAM incorporated in a display device of the kitchen video controller comprised in the system according to the fourteenth embodiment.

FIG. 57 shows a structure of a video RAM (Random Access Memory) incorporated in the display device 13 of the kitchen video controller 12 in the system according to the fourteenth embodiment. This video RAM includes a character area 571 for storing display character data in correspondence to positions on a display screen of the display device 13 and a display color data area 572 for storing display color data in correspondence to the positions on the display screen of the display device 13. Upon reception of a transmission order file 56 from the register terminal 11, the kitchen video controller 12 composes video RAM data shown in FIG. 57 by separately entering an item name 562a and display color data 562b in each order item area.

Figure 58:
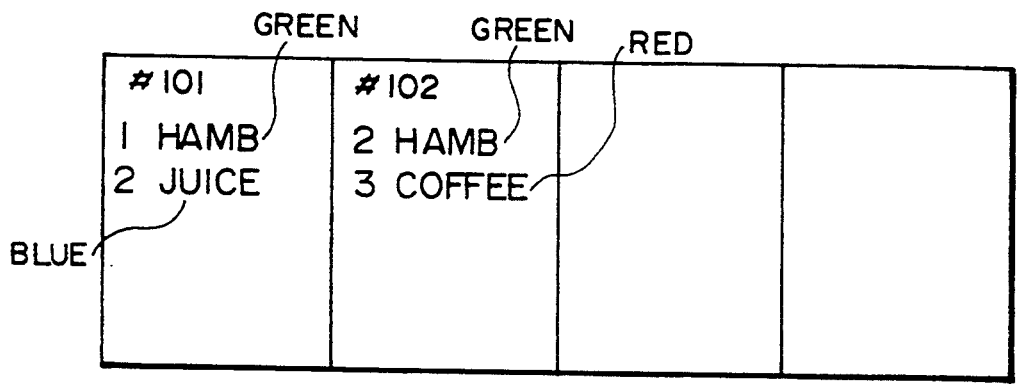
FIG. 58 is a diagram showing an example of a display made by the kitchen video controller comprised in the system according to the fourteenth embodiment of the present invention.

FIG. 58 shows an example of a display made on the display device of the kitchen video controller in the system according to the fourteenth embodiment. By way of example, with respect to each number stored in the display color data area 554 contained in the order item setting file shown in FIG. 55, "1" indicates red, "2" indicates blue and "3" indicates green, so that the items "COFFEE", "JUICE" and "HAMB" are displayed in red, blue and green, respectively, on the display device.

As will be apparent from the foregoing descriptions, with the customer order processing system according to the present invention which can be implemented in numerous forms as described above, it is possible to realize rapid transmission of customer orders to the kitchen and to manage service times for respective customers in connection with times spent in making preparations for the transmitted customer orders.

According to various aspects of the present invention incarnated by the illustrated embodiments, it is possible to have numerous advantages as mentioned below.

According to a first aspect of the present invention that a time lapse from reception of an order by the register terminal to erasure of the display of the order by a person in charge of preparation for that order upon completion of the preparation (this time lapse is referred to as the service time) is measured in conjunction with issuance of a service time management report, the service times taken for the disposition of the customer orders can be managed effectively and very efficiently, to a great advantage.

Owing to a second aspect of the present invention that time zones are previously set in the register terminal and average values of the service times in the respective time zones are obtained by calculation to thereby issue a management report on the time-zone based average service time, it is possible to manage the service times for disposing of the customer orders on a time-zone basis, to another advantage.

According to a third aspect of the present invention that desired values of service times are preliminarily set in the register terminal with the aim of issuing a management report containing a desired service time attainment rate indicated by a rate of the services times falling within a desired service time, it is possible to manage the customer service times from the standpoint of the desired service attainment rate.

According to a fourth aspect of the present invention that time zones are set preliminarily in the register terminal and that the desired service time attainment rates mentioned above with respect to the third aspect are obtained by calculation for respective time zones so as to issue a management report containing the desired service time attainment rate on a time-zone basis, it is possible to manage the service times for the customer orders from a standpoint of the time-zone based desired service time attainment rate, to another advantage.

According to a fifth aspect of the present invention that a time point, when a first item contained in a customer order is registered in the register terminal, is stored in the transmission order file and that a time lapse from the time point of registration of the first order item to erasure of that order from the display in the kitchen video controller is measured no issue a management report containing the service time data which includes the time required for the order registration as well, it is possible to manage the service times for disposing of the customer orders by taking into account the times for the customer order registrations.

According to a sixth aspect of the present invention, by the use of the customer order processing system, in which the customer order registered in the register terminal is transmitted to the kitchen video controller sequentially on an item basis (i.e., every time an ordered item is registered) so that the item is displayed on the display device of the kitchen video controller upon every registration of an item, thereby issuing a service time management report, it is possible to shorten the service time for the customer and also to manage the service time.

According to a seventh aspect of the present invention, by the use of the customer order processing system, in which an order item is stored in the kitchen video controller transmission buffer upon every item registration, and in which it is checked whether preceding data exist in the above-mentioned buffer precedent to the item registration processings, and, if preceding data exist, the preceding data are transmitted to the kitchen video controller precedent to the storage of a current order item, so that an item registered before last time is transmitted to the kitchen video controller upon every registration of a new order item, thereby issuing a service time management report, it is possible to prevent correction processings, which are performed in the register terminal, from affecting the display device of the kitchen video controller, to thereby provide a reduction in the service time for disposing of the customer order, and to manage the service time, as well.

In the customer order processing system according to an eighth aspect of the present invention, by the use of the customer order processing system, wherein, upon display of a received customer order in the kitchen video controller, a time lapse from the time of reception of the customer order to the current time point is obtained by calculation to display the time lapse in addition to the customer order on the display device, while updating the time lapse data at a predetermined period of time, thereby issuing a service time management report, it is possible to manage the service times for disposing of the customer orders, while displaying the customer service time at the current time point to a person who is in charge of preparation for the customer order concerned.

According to a ninth aspect of the present invention that, upon registration of a customer order in the register terminal, order destination information such as "EAT IN" (drinking/eating within the shop), "TAKE OUT" (indicating carrying out of the shop) or the like is registered to issue a service time report on a destination basis, it is possible to manage the service times for disposing of the customer orders, while taking into account a destination of each of the order items.

According to a tenth aspect of the present invention that the kitchen video controller is provided with a plurality of monitor control switches and a plurality of service time data files and that the monitor control switches and the service time data files are assigned to a plurality of persons, who are in charge of preparation for customer orders displayed on the kitchen display device, respectively, whereby the service time reports are issued on an assigned-person basis, it is possible to manage the service times for dealing with customer orders considered from the standpoint of respective persons in charge of preparation for the customer orders, to a further advantage of the present invention.

According to an eleventh aspect of the present invention that a plurality of register terminals are provided and the kitchen video controller is provided with a plurality of display devices and a plurality of monitor control switches, and that customer orders registered in the register terminals are classified in accordance with steer (or address) information preliminarily set for respective order items so that the customer orders are displayed on the plurality of display devices of the kitchen video controller, respectively, in accordance with the contents of a display device ID number setting table, which has been set preliminarily, to thereby issue the service time reports on an item basis, it is possible to manage the service times for the customers on an itemby-item basis, to yet another advantage of the present invention.

In the customer order processing system according to a twelfth aspect of the present invention, a plurality of register terminals are provided and the kitchen video controller is provided with a plurality of display devices and a plurality of monitor control switches so that customer orders registered in the register terminals are displayed on the plurality of display devices of the kitchen video controller, respectively, and a display device back-up ID number setting table is provided in the register terminals, so that, when display of a customer order cannot be made on any one of the display devices because of no vacant display area or a failure of a scheduled display device, etc., the customer order concerned is back-up displayed on a display device predetermined in accordance with the contents of the display device back-up ID number setting table, and then a service time management report is issued. With this system of the present invention, it is possible to make a reduction in the service times for disposing of the customer orders, to enhance the reliability of displayed information, and to manage the service times for the customers, to still further advantage of the present invention.

In a customer order processing system according to a thirteenth aspect of the present invention which is constructed so as to be capable of displaying even an order, which has once been erased, by the use of a recall display function and issuing a service time management report, it is possible to manage the service times for the customers, while allowing an order, which has once been erased by accident, to be restored to still another advantage of the present invention.

In a customer order processing system according to a fourteenth embodiment of the present invention which is applied to a drive-through shop where a passenger in a vehicle can issue an order for purchasing an article while he stays in the vehicle, a vehicle detector operating on an electromagnetic induction principle or the like is installed at a position where the vehicle passes immediately after the issuance of the order and a vehicle detection signal outputted from the vehicle detector is inputted to the kitchen video controller so that the time point of inputting the vehicle detection signal can be used as a service-time measurement starting time point, whereby it is possible to control the start of measurement of the service time for the customer order by taking into account the location of the vehicle.

In a customer order processing system according to a fifteenth embodiment which is applied to a so-called drive-through shop where a passenger can order and purchase an article without getting out of his or her vehicle, a vehicle detector operating on an electromagnetic induction principle is installed at a position where the vehicle passes immediately after the reception of an ordered article, and a vehicle detection signal outputted from the vehicle detector is inputted to the kitchen video controller to thereby allow the service time taken for the disposition of the order to be determined by subtracting the service-time measurement starting time from the time of generation of the vehicle detection signal, whereby it is possible to manage the beginning and the end of the service for the customer from a viewpoint of the vehicle position.

Further, according to a sixteenth aspect of the present invention that signal transmission between a monitor control switch of the kitchen video controller and an arithmetic operation control apparatus is performed through wireless communication by using an infrared ray, an electromagnetic wave or the like, and thereby a service time management report is issued, it is made possible even for a person, who moves around in the preparation for the customer order, to manage the service time for a customer by the use of an easily operable monitor control switch.

Finally, according to a seventeenth aspect of the present invention that a color display is provided in the kitchen video controller, and that display color data for determining colors for the items displayed on the display device of the kitchen video controller are set for respective items in the order item setting file stored in the memory of the register terminal, it is possible to assign an optional color representation to each order item, and the service time management report thereby issued facilitates easier discrimination of displayed items to be used in managing the service items for the customers.

We claim:

1. A customer order comprising:
(a) a video controller; and (b) a register terminal,
said register terminal comprising
input means for receiving customer orders,
a memory for storing data for performing registration and totalization processings on said customer orders,
transmission means for sequentially transmitting said customer orders, as said customer orders are registered, to said video controller and for transmitting request commands to said video controller; and
said video controller comprising:
an arithmetic operation control apparatus for centrally controlling the system,
display means for sequentially displaying said customer orders, as said customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, in response to a request command issued by said register terminal, said service time data stored in said service time data storage means to said register terminal in a form of a report, wherein said register terminal generates classification flags for classifying customer order items, as said customer order items are registered in said register terminal, as one of (i) an initial item, (ii) an intermediate item, and (iii) a final item before transmission of said customer order items, and upon registration of said customer order items of a customer order in said register terminal, information representative of said classification flags is transmitted to said video controller, together with said customer order items to thereby display said customer order items together with said flags of said display means of said video controller.

2. A customer order processing system according to claim 1, wherein said video controller is a kitchen video controller.

3. A customer order processing system, comprising: (a) a video controller; and (b) a register terminal, said register terminal comprising:
input means for receiving customer orders,
transmission means for sequentially transmitting said customer orders to a video controller, and
storage means for storing information of a time of reception, of a first item contained in a customer order, in a file for use in order transmission; and
said video controller comprising:
display means for sequentially displaying the customer orders, as the customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, response to a request command from said register terminal, data representative of said service time stored in said service time data storage means to said register terminal, thereby issuing a management report, wherein said register terminal generates classification flags for classifying customer order items, as said customer order items are registered in said register terminal, as one of (i) an initial item, (ii) an intermediate item and (iii) a final item before the transmission of said customer order items, and upon registration of said customer order items of a customer order in said registration terminal, information of said classification flags is transmitted to said video controller, together with said customer order items, to thereby display said customer order items together with said flags on said display means of said video controller.

4. A customer order processing system according to claims 3, wherein said video controller is a kitchen video controller.

5. A customer order processing system comprising: (a) a video controller; and (b) a register terminal, said register terminal comprising:
input means for receiving customer orders,
a memory for storing data for performing registration and totalization processings on said customer orders, and
transmission means for sequentially transmitting said customer orders, as said customer orders are registered, to said video controller and for transmitting request commands to said video controller; and
said video controller comprising:
an arithmetic operation control apparatus for centrally controlling the system,
display means for sequentially displaying said customer orders, as said customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, in response to a request command issued by said register terminal, said service time data stored in said service time data storage means to said register terminal in a form of a report, wherein upon every registration of an item of a customer order, said register terminal stores data of the item together with an item classifying flag in a transmission buffer provided for the transmission of the data to said video controller, and upon every registration of a new order item, said transmission buffer is checked prior to registration processings to decide whether data are stored in said transmission buffer, and when data are stored in said transmission buffer, said data stored in the transmission buffer are transmitted to said video controller so that, upon every registration of a new item of a customer order, an item registered immediately prior to said new item is transmitted to said video controller so as to displayed on said display means thereof.

6. A customer order processing system according to claim 5, wherein said video controller is a kitchen video controller.

7. A customer order processing system comprising: (a) a video controller; and (b) a register terminal, said register terminal comprising:
input means for receiving customer orders,
transmission means for sequentially transmitting said customer orders to a video controller, and
storage means for storing information of a time of reception, of a first item contained in a customer order, file for use in order transmission; and
said video controller comprising:
display means for sequentially displaying the customer orders, as the customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, in response to a request command from said register terminal, data representative of said service time stored in said service time data storage means to said register terminal, thereby issuing a management report, wherein upon every registration of an item of a customer order, said register terminal stores data of the item together with an item classifying flag in a transmission buffer provided for the transmission of the data to said video controller, and upon every registration of a new order item, said transmission buffer is checked prior to registration processings to decide whether data are stored in said transmission buffer, and when data are stored in said transmission buffer, said data stored in the transmission buffer are transmitted to said video controller, so that upon every registration of a new item of a customer order, an item registered immediately prior to said new item, is transmitted to said video controller so as to be displayed on said display means thereof.

8. A customer order processing system according to claim 7, wherein said video controller is a kitchen video controller.

9. A customer order processing system comprising: (a) a video controller; and (b) a register terminal,
said register terminal comprising:
input means for receiving customer orders,
a memory for storing data for performing registration and totalization processings on said customer orders, and
transmission means for sequentially transmitting said customer orders, as said customer orders are registered to said video controller and for transmitting request commands to said video controller; and
said video controller comprising:
an arithmetic operation control apparatus for centrally controlling the system,
display means for sequentially displaying said customer orders, as said customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, in response to a request command issued by said register terminal, said service time data stored in said service time data storage means to said register terminal in a form of a report, wherein said video controller further comprises:
an order recall display memory,
an order recall key provided in said control switch input means,
display information holding means for constantly holding display information of a last erased customer order immediately by storing the display information of said last erased customer order in said order recall display memory before said last erased customer order is erased by operating said control switch input means, and
recall display means, responsive to an operation of said order recall key, for reading out contents of said order recall display memory to said display means.

10. A customer order processing system according to claim 9, wherein said video controller is a kitchen video controller.

11. A customer order processing system comprising: (a) a video controller; and (b) a register terminal,
said register terminal comprising:
input means for receiving customer orders,
a memory for storing data for performing registration and totalization processings on said customer orders, and
transmission means for sequentially transmitting said customer orders, as said customer orders are registered, to said video controller and for transmitting request commands to said video controller; and
said video controller comprising:
an arithmetic operation control apparatus for centrally controlling the system,
display means for sequentially displaying said customer orders, as said customer orders are received from said register terminal,
control switch input means, operable person in charge of preparation of a selected customer order, for erasing a display of said selected customer order on said display means upon completion of preparation of said particular customer order,
service time data storage means for (i) during a time length between a time point of reception of said selected customer order and a time point of erasure of said selected customer order and (ii) storing said time length as service time data, and
management report issuing means for transmitting, in response to a request command issued by said register terminal, said service time data stored in said service time data storage means to said register terminal in a form of a report, wherein said customer order processing system is designed to be installed in a drive-through shop where a vehicle passenger can order and purchase an article without getting out of a vehicle, said system further comprising:
a vehicle detector, installed at a location which the vehicle passes after having transmitted the customer order to said shop, for generating a vehicle detection signal; and
service time measurement starting time generating means, responsive to said vehicle detection signal outputted from said vehicle detector, for setting a time of generation of said vehicle detection signal as said time point of reception of a customer order.

12. A customer order processing system according to claim 11, further comprising:
a second vehicle detector, installed at a location which said vehicle passes immediately after reception of the article from the shop, for generating a second vehicle detector signal; and
service time measuring means, responsive to said first and second vehicle detection signals, for measuring a service time taken for completing said customer order by subtracting said time point of reception of a customer order from a time point of generation of said second vehicle detection signal.

13. A customer order processing system according to claim 11, wherein said video controller is a kitchen video controller.

14. A customer order processing system comprising: (a) a video controller; and (b) a register terminal,
said register terminal comprising:
input means for receiving customer orders,
a memory for storing data for performing registration and totalization processings on said customer orders, and
transmission means for sequentially transmitting said customer orders, as said customer orders are registered, to said video controller and for transmitting request commands to said video controller; and
said video controller comprising:
an arithmetic operation control apparatus for centrally controlling the system, display means for sequentially displaying said customer orders, as said customer orders are received from said register terminal, control switch input means, operable by a person in charge of preparation of a selected customer order, for erasing a display of said selected customer order on said display means upon completion of preparation of said particular customer order, service time data storage means for (i) measuring a time length between a time point of reception of said selected customer order and a time point of erasure of said selected customer order and (ii) storing said time length as service time data, and management report issuing means for transmitting, in response to a request command issued by said register terminal, said service time data stored in said service time data storage means to said register terminal in a form of a report, wherein said customer order processing system is designed for installation in a drive-through shop where a vehicle passenger can order and purchase an article without getting out of a vehicle, said system further comprising:

a vehicle detector, installed at a location which a vehicle passes immediately after reception of the article from the shop, for generating a vehicle detector signal; and service time measuring means, responsive to said vehicle detection signal generated by said vehicle detector, for measuring a service time taken for completing said customer order by subtracting a service time measurement starting time of said order from a time of generation of said vehicle detection signal.

15. A customer order processing system according to claim 14, wherein said video controller is a kitchen video controller.

16. A customer order processing system comprising:
(a) a video controller; and (b) a register terminal,
said register terminal comprising:
input means for receiving customer orders,
a memory for storing data for performing registration and totalization processings on said customer orders, and
transmission means for sequentially transmitting said customer orders, as said customer orders are registered, to said video controller and for transmitting request commands to said video controller; and
said video controller comprising:
an arithmetic operation control apparatus for centrally controlling the system,
display means for sequentially displaying said customer orders, as said customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, in response to a request command issued by said register terminal, said service time data stored in said service time data storage means to said register terminal in a form of a report, wherein said display means of said video controller includes a color display device, and display color data, for determining display colors of said color display device of said video controller at individual times, are stored in an order item setting file provided in said memory of said register terminal, and upon transmission of the customer order from said register terminal to said video controller, said display color data for the items contained in said customer order are transmitted to said video controller, and said display means of said video controller includes display color data storage means comprising a video data RAM for storing (i) display character data and (ii) display color data in correspondence to display positions, respectively, on a display screen of said display means.

17. A customer order processing system according to claim 16, wherein said video controller is a kitchen video controller.

18. A customer order processing system comprising:
(a) a video controller; and (b) a register terminal,
said register terminal comprising:
input means for receiving customer orders,
a memory for storing data for performing registration and totalization processings on said customer orders, and
transmission means for sequentially transmitting said customer orders, as said customer orders are registered, to said video controller and for transmitting request commands to said video controller; and
said video controller comprising:
an arithmetic operation control apparatus for centrally controlling the system,
display means for sequentially displaying said customer orders, as said customer orders are received from said register terminal,
control switch input means, operable by a person in charge of preparation of a selected customer order, for erasing a display of said selected customer order on said display means upon completion of preparation of said particular customer order,
service time data storage means for (i) measuring a time length between a time point of reception of said selected customer order and a time point of erasure of said selected customer order and (ii) storing said time length as service time data, and
management report issuing means for transmitting, in response to a request command issued by said register terminal, said service time data stored in said service time data storage means to said register terminal in a form of a report, said processing system further comprising a plurality of register terminals, and wherein said display means comprises a plurality of display units, said control switch input means includes a plurality of switches respectively assigned to said plurality of display units, said register terminals register customer orders by using steer information, preliminarily set in said register terminals, used to determine one of said display units on which a customer order is to be displayed, and said customer order is displayed on said one of said display units.

19. A customer order processing system according to claim 18, further comprising back-up means for generating a back-up ID number table, and wherein when a display unit, indicated by said steer information, fails to display a customer order, said back-up means controls a different one of said display units to display said customer order.

20. A customer order processing system according to claim 18, wherein said video controller is a kitchen video controller.

* * * * *

UNITED STATES PATENT AND TRADEMARK OFFICE
CERTIFICATE OF CORRECTION

PATENT NO. : 5,377,097
DATED : December 27, 1994
INVENTOR(S) : Seiji FUYAMA and Kenichi ISHIKAWA, both of Yokohama; Satoko MOMOSE, Tama; Tokio MORI, Yokohama, all of Japan It is certified that error appears in the above-indentified patent and that said Letters Patent is hereby corrected as shown below:

Claim 1, col. 26, line 60, after "before" insert --the--;

col. 26, line 67, change "flags of" to --classification flags on--.

Claim 3, col. 27, line 9, change "a" to --said--;

col. 27, line 44, before "flags" insert --classification--.

Claim 5, col. 28, line 16, after "provided" insert --therein--.

Claim 7, col. 28, line 36, change "a" to --said--;

col. 28, line 62, after "provided" insert --therein--.

Claim 9, col. 29, line 54, after "out" insert --and displaying--;

col. 29, line 55, change "to said" to --on said sequential--;

col. 29, line 56, after "means" insert --, thereby performing a recall display of erased customer orders--.

Claim 12, col. 30, line 44, change "detector" to --detection--.

UNITED STATES PATENT AND TRADEMARK OFFICE
CERTIFICATE OF CORRECTION

PATENT NO. : 5,377,097
DATED : December 27, 1994
INVENTOR(S) : Seiji Fuyama, et al It is certified that error appears in the above-indentified patent and that said Letters Patent is hereby corrected as shown below:

Claim 14, col. 31, line 26, change "tector" to --tection--

Claim 18, col. 32, line 57, delete "used".

Signed and Sealed this

Sixteenth Day of May, 1995

Attest:

BRUCE LEHMAN

*Attesting Officer*  *Commissioner of Patents and Trademarks*